United States Patent
Crabtree et al.

(10) Patent No.: US 12,452,284 B2
(45) Date of Patent: Oct. 21, 2025

(54) DYNAMIC CYBERATTACK MISSION PLANNING AND ANALYSIS

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 300 days.

(21) Appl. No.: 18/343,716

(22) Filed: Jun. 28, 2023

(65) Prior Publication Data

US 2025/0007942 A1    Jan. 2, 2025

(51) Int. Cl.
H04L 9/40    (2022.01)

(52) U.S. Cl.
CPC .......... *H04L 63/1433* (2013.01); *H04L 63/20* (2013.01)

(58) Field of Classification Search
CPC ........................... H04L 63/1433; H04L 63/20
USPC ............................................................. 726/1
See application file for complete search history.

(56) References Cited

U.S. PATENT DOCUMENTS

| | | | |
|---|---|---|---|
| 5,669,000 A | 9/1997 | Jessen et al. | |
| 6,256,544 B1 | 7/2001 | Weissinger | |
| 6,477,572 B1 | 11/2002 | Elderton et al. | |
| 7,072,863 B1 | 7/2006 | Phillips et al. | |
| 7,657,406 B2 | 2/2010 | Tolone et al. | |
| 7,698,213 B2 | 4/2010 | Lancaster | |
| 7,739,653 B2 | 6/2010 | Venolia | |
| 8,065,257 B2 | 11/2011 | Kuecuekyan | |
| 8,145,761 B2 | 3/2012 | Liu et al. | |
| 8,281,121 B2 | 10/2012 | Nath et al. | |
| 8,615,800 B2 | 12/2013 | Baddour et al. | |
| 8,788,306 B2 | 7/2014 | Delurgio et al. | |
| 8,793,758 B2 | 7/2014 | Raleigh et al. | |
| 8,914,878 B2 | 12/2014 | Burns et al. | |
| 8,997,233 B2 | 3/2015 | Green et al. | |
| 9,134,966 B2 | 9/2015 | Brock et al. | |
| 9,141,360 B1 | 9/2015 | Chen et al. | |
| 9,231,962 B1 | 1/2016 | Yen et al. | |
| 9,294,497 B1 | 3/2016 | Ben-Or et al. | |

(Continued)

FOREIGN PATENT DOCUMENTS

| | | |
|---|---|---|
| WO | 2014159150 A1 | 10/2014 |
| WO | 2017075543 A1 | 5/2017 |

*Primary Examiner* — Teshome Hailu
(74) *Attorney, Agent, or Firm* — Galvin Patent Law LLC; Brian R Galvin

(57) ABSTRACT

A system and method for cybersecurity mission planning and analysis which uses artificial intelligence systems to make red and blue team exercises more comprehensive and effective by supplementing individual expertise, reducing reliance on intuition, and eliminating gaps in knowledge. In an embodiment, a platform for cyberattack missions planning and analysis by red and blue teams is coordinated by a control center. An incident generator generates cyberattack scenarios and events using data from external databases and an internal attack knowledge manager having a knowledge graph of data about the network under attack in conjunction with one or more machine learning algorithms configured to identify potential network vulnerabilities. Red are guided by a machine learning algorithm configured to provide suggestions as to potential successful attack paths. Blue teams are guided by a machine learning algorithm configured to provide suggestions as to potential successful attack paths.

16 Claims, 13 Drawing Sheets

(56) References Cited

U.S. PATENT DOCUMENTS

| | | |
|---|---|---|
| 9,306,965 B1 | 4/2016 | Grossman et al. |
| 9,602,530 B2 | 3/2017 | Ellis et al. |
| 9,654,495 B2 | 5/2017 | Hubbard et al. |
| 9,672,355 B2 | 6/2017 | Titonis et al. |
| 9,686,308 B1 | 6/2017 | Srivastava |
| 9,762,443 B2 | 9/2017 | Dickey |
| 9,887,933 B2 | 2/2018 | Lawrence, III |
| 9,946,517 B2 | 4/2018 | Talby et al. |
| 10,061,635 B2 | 8/2018 | Ellwein |
| 10,102,480 B2 | 10/2018 | Dirac et al. |
| 10,210,246 B2 | 2/2019 | Stojanovic et al. |
| 10,210,255 B2 | 2/2019 | Crabtree et al. |
| 10,216,485 B2 | 2/2019 | Misra et al. |
| 10,242,406 B2 | 3/2019 | Kumar et al. |
| 10,248,910 B2 | 4/2019 | Crabtree et al. |
| 10,318,882 B2 | 6/2019 | Brueckner et al. |
| 10,367,829 B2 | 7/2019 | Huang et al. |
| 10,511,498 B1 | 12/2019 | Narayan et al. |
| 11,736,527 B1 * | 8/2023 | Joseph Durairaj et al. ............... H04L 63/1433 726/1 |
| 12,225,031 B1 * | 2/2025 | Coull ................ H04L 63/1433 |
| 2003/0041254 A1 | 2/2003 | Challener et al. |
| 2003/0145225 A1 | 7/2003 | Bruton et al. |
| 2004/0098610 A1 | 5/2004 | Hrastar |
| 2005/0289072 A1 | 12/2005 | Sabharwal |
| 2006/0149575 A1 | 7/2006 | Varadarajan et al. |
| 2007/0150744 A1 | 6/2007 | Cheng et al. |
| 2009/0012760 A1 | 1/2009 | Schunemann |
| 2009/0064088 A1 | 3/2009 | Barcia et al. |
| 2009/0089227 A1 | 4/2009 | Sturrock et al. |
| 2009/0182672 A1 | 7/2009 | Doyle |
| 2009/0222562 A1 | 9/2009 | Liu et al. |
| 2009/0293128 A1 | 11/2009 | Lippmann et al. |
| 2011/0060821 A1 | 3/2011 | Loizeaux et al. |
| 2011/0087888 A1 | 4/2011 | Rennie |
| 2011/0154341 A1 | 6/2011 | Pueyo et al. |
| 2012/0266244 A1 | 10/2012 | Green et al. |
| 2013/0073062 A1 | 3/2013 | Smith et al. |
| 2013/0132149 A1 | 5/2013 | Wei et al. |
| 2013/0191416 A1 | 7/2013 | Lee et al. |
| 2013/0246996 A1 | 9/2013 | Duggal et al. |
| 2013/0304623 A1 | 11/2013 | Kumar et al. |
| 2014/0074826 A1 | 3/2014 | Cooper et al. |
| 2014/0156806 A1 | 6/2014 | Karpistsenko et al. |
| 2014/0244612 A1 | 8/2014 | Bhasin et al. |
| 2014/0245443 A1 | 8/2014 | Chakraborty |
| 2014/0279762 A1 | 9/2014 | Xaypanya et al. |
| 2015/0095303 A1 | 4/2015 | Sonmez et al. |
| 2015/0149979 A1 | 5/2015 | Talby et al. |
| 2015/0163242 A1 | 6/2015 | Laidlaw et al. |
| 2015/0169294 A1 | 6/2015 | Brock et al. |
| 2015/0195192 A1 | 7/2015 | Vasseur et al. |
| 2015/0236935 A1 | 8/2015 | Bassett |
| 2015/0281225 A1 | 10/2015 | Schoen et al. |
| 2015/0317481 A1 | 11/2015 | Gardner et al. |
| 2015/0339263 A1 | 11/2015 | Ata et al. |
| 2015/0347414 A1 | 12/2015 | Xiao et al. |
| 2015/0379424 A1 | 12/2015 | Dirac et al. |
| 2016/0004858 A1 | 1/2016 | Chen et al. |
| 2016/0028758 A1 | 1/2016 | Ellis et al. |
| 2016/0072845 A1 | 3/2016 | Chiviendacz et al. |
| 2016/0078361 A1 | 3/2016 | Brueckner et al. |
| 2016/0099960 A1 | 4/2016 | Gerritz et al. |
| 2016/0105454 A1 | 4/2016 | Li et al. |
| 2016/0140519 A1 | 5/2016 | Trepca et al. |
| 2016/0212171 A1 | 7/2016 | Senanayake et al. |
| 2016/0275123 A1 | 9/2016 | Lin et al. |
| 2016/0285732 A1 | 9/2016 | Brech et al. |
| 2016/0342606 A1 | 11/2016 | Mouel et al. |
| 2016/0350442 A1 | 12/2016 | Crosby |
| 2016/0364307 A1 | 12/2016 | Garg et al. |
| 2017/0013003 A1 | 1/2017 | Samuni et al. |
| 2017/0019678 A1 | 1/2017 | Kim et al. |
| 2017/0063896 A1 | 3/2017 | Muddu et al. |
| 2017/0083380 A1 | 3/2017 | Bishop et al. |
| 2017/0126712 A1 | 5/2017 | Crabtree et al. |
| 2017/0139763 A1 | 5/2017 | Ellwein |
| 2017/0149802 A1 | 5/2017 | Huang et al. |
| 2017/0193110 A1 | 7/2017 | Crabtree et al. |
| 2017/0206360 A1 | 7/2017 | Brucker et al. |
| 2017/0322959 A1 | 11/2017 | Tidwell et al. |
| 2017/0323089 A1 | 11/2017 | Duggal et al. |
| 2018/0197128 A1 | 7/2018 | Carstens et al. |
| 2018/0300930 A1 | 10/2018 | Kennedy et al. |
| 2018/0367549 A1 * | 12/2018 | Jang ..................... G06N 5/022 |
| 2019/0082305 A1 | 3/2019 | Proctor |
| 2019/0095533 A1 | 3/2019 | Levine et al. |
| 2021/0194909 A1 * | 6/2021 | Tang .................... G06F 21/552 |
| 2023/0179622 A1 * | 6/2023 | Underwood ........... H04L 41/14 726/25 |
| 2023/0412635 A1 * | 12/2023 | Binyamini ............. G06N 5/022 |

\* cited by examiner

DYNAMIC CYBERATTACK MISSION PLANNING AND ANALYSIS

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of cyberattack planning, across prevention, identification, detection, response and recovery, and more particularly to AI-assisted cyber operations mission planning and optimization.

Discussion of the State of the Art

Offense versus defense scrimmages, commonly referred to as red versus blue team or purple team exercises, are commonly used in cybersecurity to analyze and assess the effectiveness of an organization's security measures and defenses against cyberattacks. The red team is responsible for conducting offensive security activities to probe defenses. Simple red team exercises may involve limited scope and defined entry points or scenarios. More advanced examples may include simulating an attacker or a group of attackers with a defined set of behaviors and tools to emulate specific threat actor profiles. Other common activities may include control validation where specific malicious or operational actions are injected into the system at specific locations to see if network or device instrumentation observes or detects activity of interest. The blue team represents the organization's defenders, typically the in-house security operations team or incident response team. The interaction between the red and blue teams helps identify weaknesses and vulnerabilities that may have been overlooked by the blue team during routine security assessments by simulating real-world attacks and rehearsing coordinated response actions within security and potentially other business elements such as IT or operations or executive/board engagement.

Historically, red and blue team assessments of cybersecurity relied entirely on the expertise of the red and blue team members. Thus, the quality of red and blue team cybersecurity assessments varied substantially depending on the expertise of the individuals comprising each team. Further, the process is entirely intuitive, with red and blue team members operating based on their own personal knowledge and experience, often on a trial and error basis. As no person or team can be an expert in all aspects of cybersecurity, gaps in knowledge and experience will often dictate the outcome of red and blue team exercises, leaving open the question as to whether the exercise has comprehensively addressed all possible cybersecurity concerns. In response to this, automated pen test solutions were developed to combine an offensive "attack execution engine" with attack path planners to record a multitude of potential attack paths during an offensive exercise and reduce the manpower associated with such activities. In practice, such tools fail to adequately integrate red and blue related data, which evolves over the course of a given exercise, to reflect the ongoing information gain and loss present in a dynamically evolving network environment which is impacted by both attacker and defender actions along any given attack path which manifests.

What is needed is a system and method for cybersecurity mission planning and analysis which uses artificial intelligence systems to make red and blue team exercises more comprehensive and effective by supplementing individual and team expertise, reducing reliance on intuition, and aiding decision-making based on evolving gaps in knowledge about the network, business processes being supported and ultimate financial and reputational impact.

SUMMARY OF THE INVENTION

Accordingly, the inventor has conceived and reduced to practice, a system and method for cybersecurity mission planning and analysis which uses artificial intelligence systems to make red and blue team exercises more comprehensive and effective by supplementing individual expertise, reducing reliance on intuition, and aiding decision-making based on evolving gaps in knowledge. In an embodiment, a platform for cyberattack missions planning and analysis by red and blue teams is coordinated by a control center that supports exercise observation, scoring, after action replay and builds a growing knowledge base for future human or machine based operations planning. An incident generator generates cyberattack scenarios and events using data from external databases and an internal attack knowledge manager having a knowledge graph of data about the network under attack in conjunction with one or more machine learning algorithms configured to identify potential network vulnerabilities. Red collaborates with a set of machine learning algorithms configured to provide suggestions as to potential successful attack paths. Blue teams are guided by a set of machine learning algorithms configured to provide suggestions as to potential impacts of prospective or successful attack paths and potential responses to prevent, interdict, mitigate, respond or recover. Notably, the system is able to track the evolving knowledge of both red and blue teams about the network and systems of interest as they both use their incomplete instrumentation and interactions to aggregate, analyze, interpret and respond in the ongoing adversarial game. Additionally, the system is capable of tracking multiple actors on a single target system of interest as real-world events sometimes have multiple adversaries but such interactions are rarely considered when completing table top exercises or even advanced adversary emulation. Additionally the system is designed to ingest data from offensive tools such as Empire or Cobalt Strike and from blue team tools such as EDRs and SIEMS, to inform the activity log. This enables the composite event to consider "split screen" evaluations and planning and to better estimate human and machine resource consumption from tasks which are as diverse as information gathering to response actions.

Red and blue teams are used in cybersecurity to analyze and assess the effectiveness of an organization's security measures and defenses against cyberattacks. The red team is responsible for simulating an attacker or a group of attackers. Its primary objective is to identify vulnerabilities and exploit them to gain unauthorized access, gather sensitive information, or disrupt systems. Red team members adopt the mindset and tactics of real-world adversaries and use a variety of attack techniques to penetrate an organization's defenses. This can include social engineering, penetration testing, vulnerability scanning, and other offensive security methods. The blue team represents the organization's defenders, typically the in-house security team or incident response team. Its role is to detect, respond to, and mitigate the attacks simulated by the red team. Blue team members monitor network and system logs, analyze security alerts, and actively defend against the red team's attacks. They use security tools, such as intrusion detection systems (IDS), firewalls, endpoint protection systems, and security information and event management (SIEM) platforms to identify and respond to security incidents.

The interaction between the red and blue teams is a method for testing of an organization's security posture. The red team helps identify weaknesses and vulnerabilities that may have been overlooked by the blue team during routine security assessments. By simulating real-world attacks, the red team can provide valuable insights into the effectiveness of security controls, incident response capabilities, and the overall resilience of the organization's systems. The blue team, on the other hand, gains hands-on experience in detecting and responding to actual attacks. It learns to recognize indicators of compromise (IOCs), investigate security incidents, and strengthen the organization's defenses based on the lessons learned from engagements with the red team.

By conducting red team exercises, organizations can proactively identify security gaps, improve incident response procedures, and enhance their overall security posture. This iterative process helps organizations stay ahead of emerging threats and better protect their critical assets and sensitive information. However, red and blue team assessments of cybersecurity rely entirely on the expertise of the red and blue team members. Thus, the quality of red and blue team cybersecurity assessments varies depending on the expertise of the individuals comprising each team. Further, the process is entirely intuitive, with red and blue team members operating based on their own personal knowledge and experience, often on a trial and error basis. As no person or team can be an expert in all aspects of cybersecurity, gaps in knowledge and experience will often dictate the outcome of red and blue team exercises, leaving open the question as to whether the exercise has comprehensively addressed all possible cybersecurity concerns.

An AI-assisted cybersecurity mission planning and analysis system and method would help to ensure that red and blue team exercises do comprehensively address all possible cybersecurity concerns by supplementing individual expertise, reducing reliance on intuition, and eliminating gaps in knowledge.

An attack knowledge manager may be used to store the complex relationships between networks, network owners or operators, and contextual information about cybersecurity threats and defenses. A cybersecurity ontology may be used to organize information in the knowledge graph. Using a knowledge graph to store the information about the network, its enterprise owner, and any contextual knowledge about attacks and defenses is useful because complex relationships that can be represented and analyzed by machine learning algorithms to identify little-known, hidden, or unknown relationships that may affect cybersecurity. The systems is further capable of tracking attacks from multiple different attackers simultaneously, providing greater real-world training and simulation capabilities.

Contextual information for the knowledge graph and/or ontology may be obtained from third party cybersecurity databases. One such database is the MITRE ATT&CK (Adversarial Tactics, Techniques, and Common Knowledge) knowledge base and framework. It describes tactics, techniques, and procedures (TTPs) used by attackers during different stages of a cyberattack. The MITRE ATT&CK framework provides a standardized way to categorize and describe the various tactics and techniques employed by adversaries. It covers a wide range of attack techniques, including initial access, execution, persistence, privilege escalation, defense evasion, credential theft, lateral movement, exfiltration, and more. The framework is organized into several matrices, each focusing on a particular platform or domain, such as enterprise, mobile, or cloud. The matrices consist of different attack techniques that adversaries might employ, providing detailed information about the tactics involved, the procedures followed, and the potential defensive measures that can be taken. The ATT&CK TTPs (Tactics, Techniques, and Procedures) within the framework serve as a comprehensive catalog of known adversary behavior.

According to a preferred embodiment, an artificial-intelligence-assisted (AI-assisted) cyberattack mission planning system is disclosed, comprising: a computing device comprising a memory, a processor, and a non-volatile data storage device; a first machine learning algorithm operating on the computing device and trained to generate a cyberattack scenario based on information from a knowledge graph; a knowledge graph stored on the non-volatile data storage device, the knowledge graph comprising nodes representing entities, concepts, or events, and edges representing relationships between the nodes, wherein the knowledge graph represents knowledge about a computer network; an ontology manager comprising a first plurality of programming instructions stored in the memory which, when operating on the processor, causes the computing device to: retrieve cybersecurity context information from a cybersecurity database; organize the cybersecurity context information into an ontology; receive information about the computer network, the information comprising a network configuration; and create nodes and edges in the knowledge graph to store the information about the computer network according to the ontology. an incident generator comprising a second plurality of programming instructions stored in the memory which, when operating on the processor, causes the computing device to: retrieve a cybersecurity threat in the form of a tactic, techniques, or procedure from the cybersecurity database; process the cybersecurity threat through the first machine learning algorithm to generate a cyberattack scenario for the computer network based on the information about the computer network contained in the knowledge graph; and generate a cybersecurity incident for the computer network from the cyberattack scenario, the cybersecurity incident comprising an attack mode and event severity.

According to another preferred embodiment, an artificial-intelligence-assisted (AI-assisted) cyberattack mission planning method is disclosed, comprising the steps of: a computing device comprising a memory, a processor, and a non-volatile data storage device; training a first machine learning algorithm operating on a computing device comprising a memory, a processor, and a non-volatile data storage device to generate a cyberattack scenario based on information from a knowledge graph; storing a knowledge graph stored on the non-volatile data storage device, the knowledge graph comprising nodes representing entities, concepts, or events, and edges representing relationships between the nodes, wherein the knowledge graph represents knowledge about a computer network; using an ontology manager operating on the computing device to: retrieve cybersecurity context information from a cybersecurity database; organize the cybersecurity context information into an ontology; receive information about the computer network, the information comprising a network configuration; and create nodes and edges in the knowledge graph to store the information about the computer network according to the ontology. using an incident generator operating on the computing device to: retrieve a cybersecurity threat in the form of a tactic, techniques, or procedure from the cybersecurity database; process the cybersecurity threat through the first machine learning algorithm to generate a cyberattack scenario for the computer network based on the information about the computer network contained in the knowledge graph; and generate a cybersecurity incident for the computer network from the cyberattack scenario, the cybersecurity incident comprising an attack mode and event severity.

According to an aspect of an embodiment, a control center is used to: carry out the cybersecurity incident on the computer network; and display a visualization of the progress of the cybersecurity incident.

According to an aspect of an embodiment, a second machine learning algorithm is trained to suggest defense strategies for mitigating the cybersecurity incident.

According to an aspect of an embodiment, a blue team portal provides the defense strategies to a blue team comprising information technology (IT) personnel or cybersecurity analysts assigned to mitigate the cybersecurity incident.

According to an aspect of an embodiment, a third machine learning algorithm is trained to suggest attack strategies to overcome the defense strategies.

According to an aspect of an embodiment, a red team portal provides the defense strategies to a red team comprising IT personnel or cybersecurity analysts assigned to expose weaknesses in the security of the computer network based on the cybersecurity incident.

According to an aspect of an embodiment, an incident monitor is used to log cyber metrics for the computer network during the course of the carrying out of the cybersecurity incident.

According to an aspect of an embodiment, an underwriting module is used to: retrieve a cybersecurity insurance policy, the cybersecurity insurance policy comprising a policy term; retrieve a cyber metric relevant to the policy term from the log of cyber metrics; compare the cyber metric to the policy terms to determine a compliance of the cyber metric to the policy term; and output the determination of compliance.

BRIEF DESCRIPTION OF THE DRAWING FIGURES

DETAILED DESCRIPTION OF THE INVENTION

Figure 1:
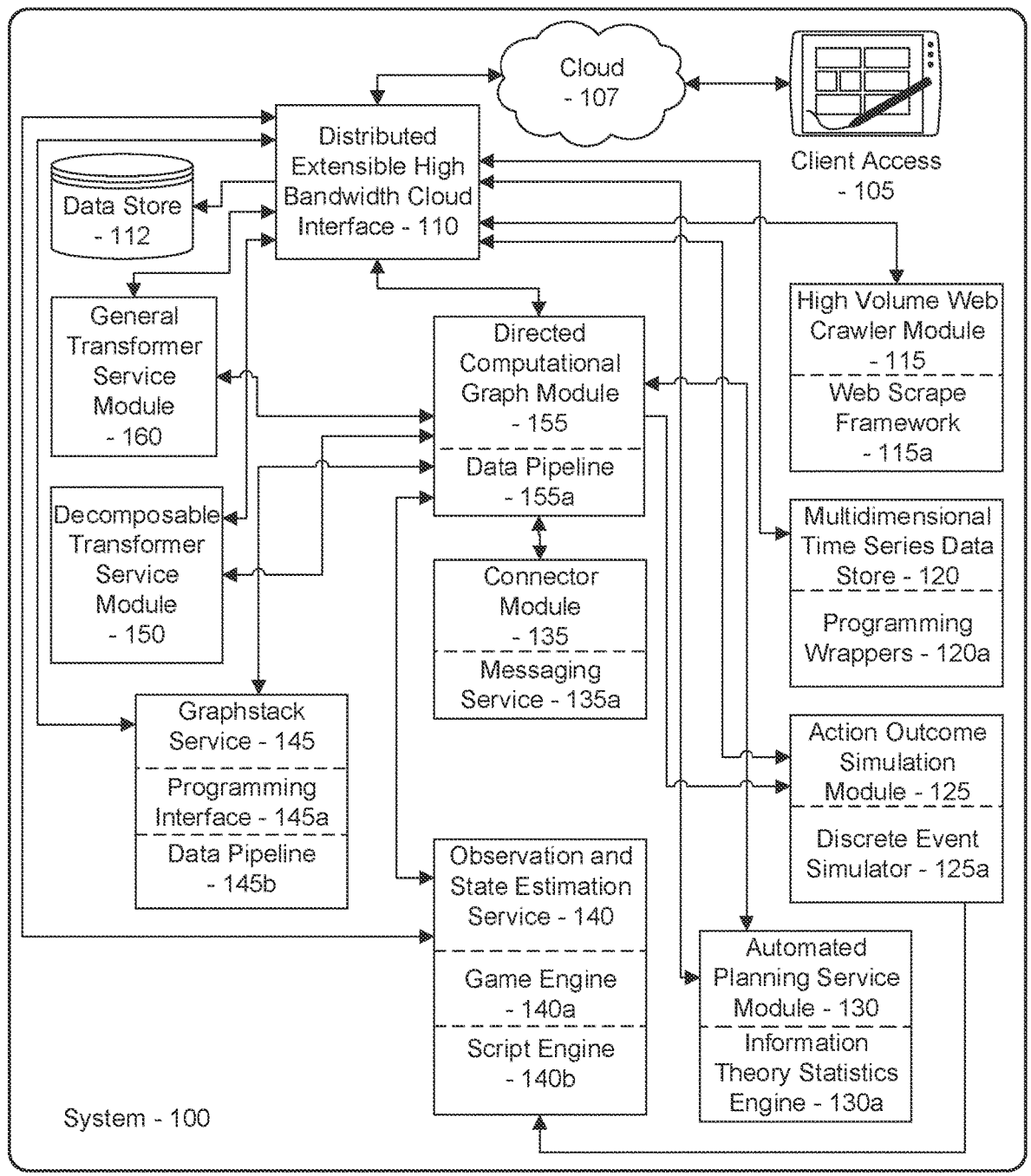
FIG. 1 is a block diagram of an exemplary system architecture for an advanced cyber decision platform.

The inventor has conceived, and reduced to practice, a system and method for cybersecurity mission planning and analysis which uses artificial intelligence systems to make red and blue team exercises more comprehensive and effective by supplementing individual expertise, reducing reliance on intuition, and aiding decision-making based on evolving gaps in knowledge. In an embodiment, a platform for cyberattack missions planning and analysis by red and blue teams is coordinated by a control center that supports exercise observation, scoring, after action replay and builds a growing knowledge base for future human or machine based operations planning. An incident generator generates cyberattack scenarios and events using data from external databases and an internal attack knowledge manager having a knowledge graph of data about the network under attack in conjunction with one or more machine learning algorithms configured to identify potential network vulnerabilities. Red collaborates with a set of machine learning algorithms configured to provide suggestions as to potential successful attack paths. Blue teams are guided by a set of machine learning algorithms configured to provide suggestions as to potential impacts of prospective or successful attack paths and potential responses to prevent, interdict, mitigate, respond or recover. Notably, the system is able to track the evolving knowledge of both red and blue teams about the network and systems of interest as they both use their incomplete instrumentation and interactions to aggregate, analyze, interpret and respond in the ongoing adversarial game. Additionally, the system is capable of tracking multiple actors on a single target system of interest as real-world events sometimes have multiple adversaries but such interactions are rarely considered when completing table top exercises or even advanced adversary emulation. Additionally the system is designed to ingest data from offensive tools such as Empire or Cobalt Strike and from blue team tools such as EDRs and SIEMS, to inform the activity log. This enables the composite event to consider "split screen" evaluations and planning and to better estimate human and machine resource consumption from tasks which are as diverse as information gathering to response actions. One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram of an advanced cyber decision platform. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™, CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines 135*a* needed to accept and convert the external data and then pass the normalized information to other analysis and transformation components of the system, the directed computational graph module 155, high volume web crawler module 115, multidimensional time series database (MDTSDB) 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155*a*, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers 120a for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database (MDTSDB) 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

When performing external reconnaissance via a network 107, web crawler 115 may be used to perform a variety of port and service scanning operations on a plurality of hosts. This may be used to target individual network hosts (for example, to examine a specific server or client device) or to broadly scan any number of hosts (such as all hosts within a particular domain, or any number of hosts up to the complete IPv4 address space). Port scanning is primarily used for gathering information about hosts and services connected to a network, using probe messages sent to hosts that prompt a response from that host. Port scanning is generally centered around the transmission control protocol (TCP), and using the information provided in a prompted response a port scan can provide information about network and application layers on the targeted host.

Port scan results can yield information on open, closed, or undetermined ports on a target host. An open port indicated that an application or service is accepting connections on this port (such as ports used for receiving customer web traffic on a web server), and these ports generally disclose the greatest quantity of useful information about the host. A closed port indicates that no application or service is listening for connections on that port, and still provides information about the host such as revealing the operating system of the host, which may be discovered by fingerprinting the TCP/IP stack in a response. Different operating systems exhibit identifiable behaviors when populating TCP fields, and collecting multiple responses and matching the fields against a database of known fingerprints makes it possible to determine the OS of the host even when no ports are open. An undetermined port is one that does not produce a requested response, generally because the port is being filtered by a firewall on the host or between the host and the network (for example, a corporate firewall behind which all internal servers operate).

Scanning may be defined by scope to limit the scan according to two dimensions, hosts and ports. A horizontal scan checks the same port on multiple hosts, often used by attackers to check for an open port on any available hosts to select a target for an attack that exploits a vulnerability using that port. This type of scan is also useful for security audits, to ensure that vulnerabilities are not exposed on any of the target hosts. A vertical scan defines multiple ports to examine on a single host, for example a "vanilla scan" which targets every port of a single host, or a "strobe scan" that targets a small subset of ports on the host. This type of scan is usually performed for vulnerability detection on single systems, and due to the single-host nature is impractical for large network scans. A block scan combines elements of both horizontal and vertical scanning, to scan multiple ports on multiple hosts. This type of scan is useful for a variety of service discovery and data collection tasks, as it allows a broad scan of many hosts (up to the entire Internet, using the complete IPv4 address space) for a number of desired ports in a single sweep.

Large port scans involve quantitative research, and as such may be treated as experimental scientific measurement and are subject to measurement and quality standards to ensure the usefulness of results. To avoid observational errors during measurement, results must be precise (describing a degree of relative proximity between individual measured values), accurate (describing relative proximity of measured values to a reference value), preserve any metadata that accompanies the measured data, avoid misinterpretation of data due to faulty measurement execution, and must be well-calibrated to efficiently expose and address issues of inaccuracy or misinterpretation. In addition to these basic requirements, large volumes of data may lead to unexpected behavior of analysis tools, and extracting a subset to perform initial analysis may help to provide an initial overview before working with the complete data set. Analysis should also be reproducible, as with all experimental science, and should incorporate publicly-available data to add value to the comprehensibility of the research as well as contributing to a "common framework" that may be used to confirm results.

When performing a port scan, web crawler 115 may employ a variety of software suitable for the task, such as Nmap, ZMap, or masscan. Nmap is suitable for large scans as well as scanning individual hosts, and excels in offering a variety of diverse scanning techniques. ZMap is a newer application and unlike Nmap (which is more general-purpose), ZMap is designed specifically with Internet-wide scans as the intent. As a result, ZMap is far less customizable and relies on horizontal port scans for functionality, achieving fast scan times using techniques of probe randomization (randomizing the order in which probes are sent to hosts, minimizing network saturation) and asynchronous design (utilizing stateless operation to send and receive packets in separate processing threads). Masscan uses the same asynchronous operation model of ZMap, as well as probe randomization. In masscan however, a certain degree of statistical randomness is sacrificed to improve computation time for large scans (such as when scanning the entire IPv4 address space), using the BlackRock algorithm. This is a modified implementation of symmetric encryption algorithm DES, with fewer rounds and modulo operations in place of binary ones to allow for arbitrary ranges and achieve faster computation time for large data sets.

Received scan responses may be collected and processed through a plurality of data pipelines 155*a* to analyze the collected information. MDTSDB 120 and graph stack 145 may be used to produce a hybrid graph/time-series database using the analyzed data, forming a graph of Internet-accessible organization resources and their evolving state information over time. Customer-specific profiling and scanning information may be linked to CPG graphs (as described below in detail, referring to FIG. 11) for a particular customer, but this information may be further linked to the base-level graph of internet-accessible resources and information. Depending on customer authorizations and legal or regulatory restrictions and authorizations, techniques used may involve both passive, semi-passive and active scanning and reconnaissance.

Figure 2:
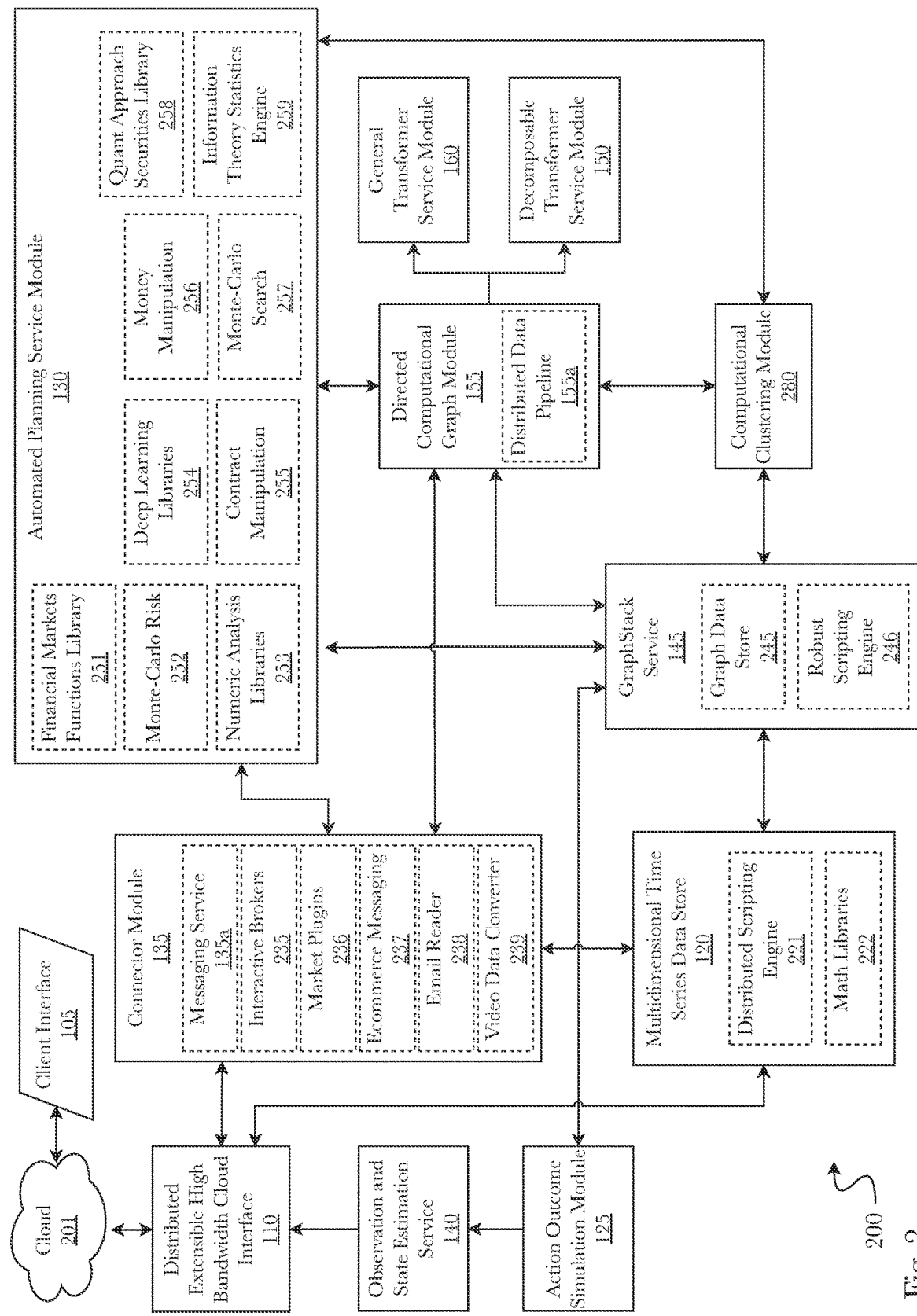
FIG. 2 is a block diagram of an advanced cyber decision platform in an exemplary configuration for use in investment vehicle management.

FIG. 2 is a block diagram of an advanced cyber decision platform in an exemplary configuration for use in investment vehicle management 200. The advanced cyber decision platform 100, when programmed to operate as quantitative trading decision platform, is very well suited to perform advanced predictive analytics and predictive simulations 202 to produce investment predictions. Much of the trading specific programming functions are added to the automated planning service module 130 of the modified advanced cyber decision platform 100 to specialize it to perform trading analytics. Specialized purpose libraries may include but are not limited to financial markets functions libraries 251, Monte-Carlo risk routines 252, numeric analysis libraries 253, deep learning libraries 254, contract manipulation functions 255, money handling functions 256, Monte-Carlo search libraries 257, and quant approach securities routines 258. Pre-existing deep learning routines including information theory statistics engine 259 may also be used. The invention may also make use of other libraries and capabilities that are known to those skilled in the art as instrumental in the regulated trade of items of worth. Data from a plurality of sources used in trade analysis are retrieved, much of it from remote, cloud resident 201 servers through the system's distributed, extensible high bandwidth cloud interface 110 using the system's connector module 135 which is specifically designed to accept data from a number of information services both public and private through interfaces to those service's applications using its messaging service 135*a* routines, due to ease of programming, are augmented with interactive broker functions 235, market data source plugins 236, e-commerce messaging interpreters 237, business-practice aware email reader 238 and programming libraries to extract information from video data sources 239.

Other modules that make up the advanced cyber decision platform may also perform significant analytical transformations on trade related data. These may include the multidimensional time series data store 120 with its robust scripting features which may include a distributive friendly, fault-tolerant, real-time, continuous run prioritizing, programming platform such as, but not limited to Erlang/OTP 221 and a compatible but comprehensive and proven library of math functions of which the C$^{++}$ math libraries are an example 222, data formalization and ability to capture time series data including irregularly transmitted, burst data; the GraphStack service 145 which transforms data into graphical representations for relational analysis and may use packages for graph format data storage such as Titan 245 or the like and a highly interface accessible programming interface an example of which may be Akka/Spray, although other, similar, combinations may equally serve the same purpose in this role 246 to facilitate optimal data handling; the directed computational graph module 155 and its distributed data pipeline 155*a* supplying related general transformer service module 160 and decomposable transformer module 150 which may efficiently carry out linear, branched, and recursive transformation pipelines during trading data analysis may be programmed with multiple trade related functions involved in predictive analytics of the received trade data. Both possibly during and following predictive analyses carried out by the system, results must be presented to clients 105 in formats best suited to convey the both important results for analysts to make highly informed decisions and, when needed, interim or final data in summary and potentially raw for direct human analysis. Simulations which may use data from a plurality of field spanning sources to predict future trade conditions these are accomplished within the action outcome simulation module 125. Data and simulation formatting may be completed or performed by the observation and state estimation service 140 using its ease of scripting and gaming engine to produce optimal presentation results.

In cases where there are both large amounts of data to be cleansed and formalized and then intricate transformations such as those that may be associated with deep machine learning, predictive analytics and predictive simulations, distribution of computer resources to a plurality of systems may be routinely required to accomplish these tasks due to the volume of data being handled and acted upon. The advanced cyber decision platform employs a distributed architecture that is highly extensible to meet these needs. A number of the tasks carried out by the system are extremely processor intensive and for these, the highly integrated process of hardware clustering of systems, possibly of a specific hardware architecture particularly suited to the calculations inherent in the task, is desirable, if not required for timely completion. The system includes a computational clustering module 280 to allow the configuration and management of such clusters during application of the advanced cyber decision platform. While the computational clustering module is drawn directly connected to specific co-modules of the advanced cyber decision platform these connections, while logical, are for ease of illustration and those skilled in the art will realize that the functions attributed to specific modules of an embodiment may require clustered computing under one use case and not under others. Similarly, the functions designated to a clustered configuration may be role, if not run, dictated. Further, not all use cases or data runs may use clustering.

Figure 3A:
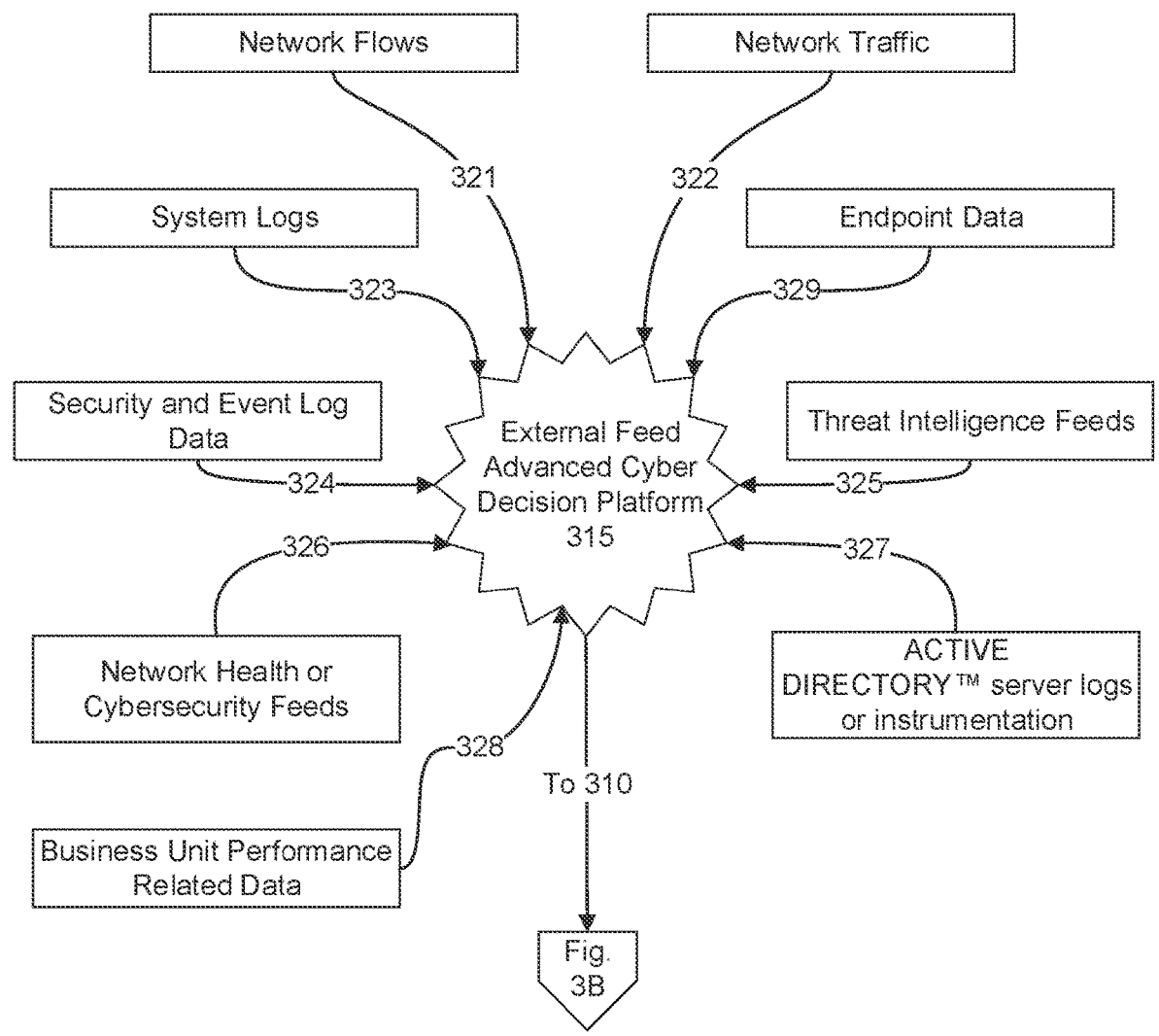
FIGS. 3A and 3B are process diagrams showing further detail regarding the operation of the advanced cyber decision platform.
Figure 3B:
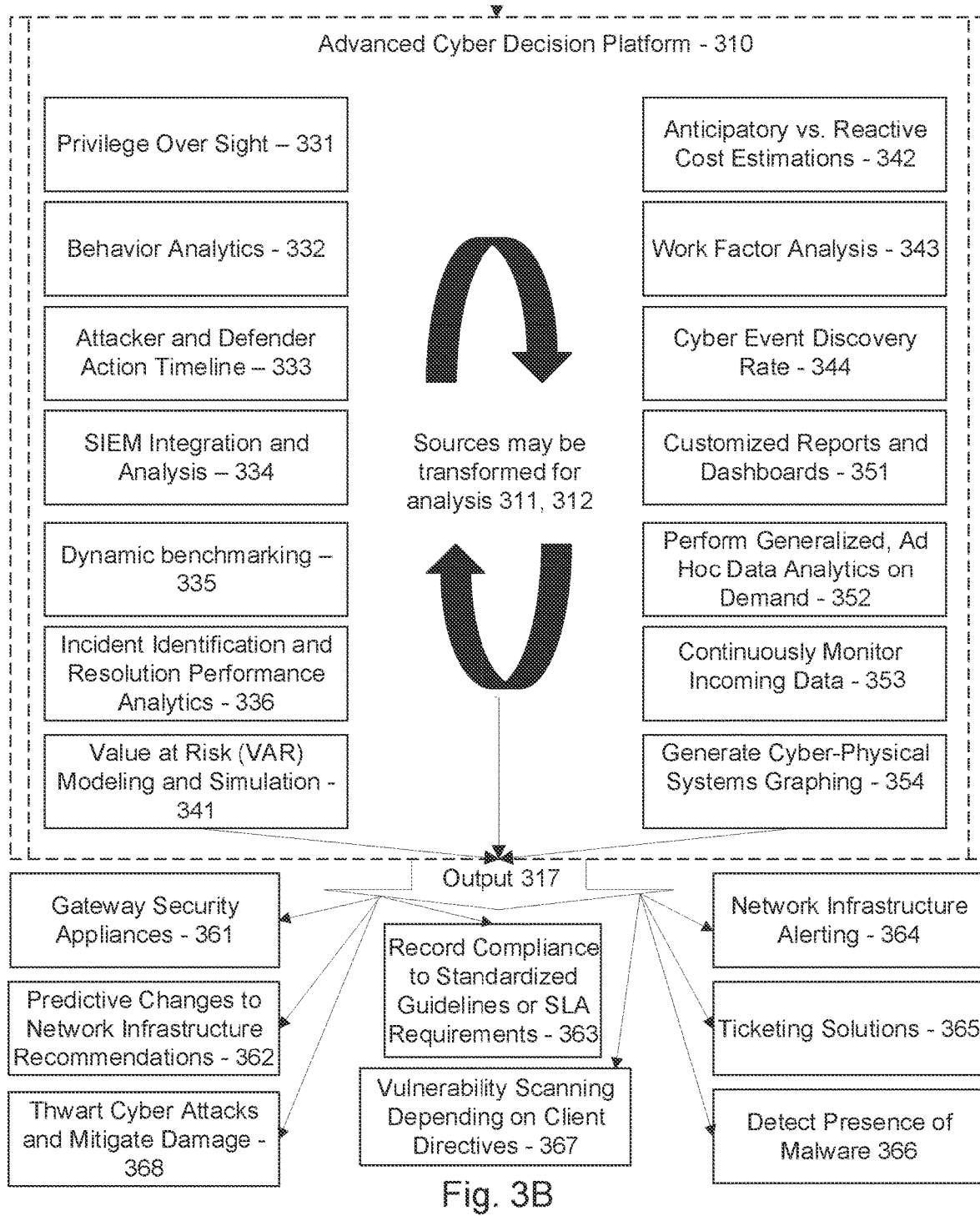

FIGS. 3A and 3B are process diagrams showing further detail regarding the operation of the advanced cyber decision platform. Input network data which may include network flow patterns 321, the origin and destination of each piece of measurable network traffic 322, system logs from servers and workstations on the network 323, endpoint data 329, any security event log data from servers or available security information and event (SIEM) systems 324, external threat intelligence feeds 324, identity or assessment context 325, external network health or cybersecurity feeds 326, Kerberos domain controller or ACTIVE DIRECTORY™ server logs or instrumentation 327, business unit performance related data 328, endpoint data 329, among many other possible data types for which the invention was designed to analyze and integrate, may pass into 315 the advanced cyber decision platform 310 for analysis as part of its cyber security function. These multiple types of data from a plurality of sources may be transformed for analysis 311, 312 using at least one of the specialized cybersecurity, risk assessment or common functions of the advanced cyber decision platform in the role of cybersecurity system, such as, but not limited to network and system user privilege oversight 331, network and system user behavior analytics 332, attacker and defender action timeline 333, STEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the advanced cyber decision platform's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, perform one time or continuous vulnerability scanning depending on client directives 367, and thwart or mitigate damage from cyber attacks 368. These examples are, of course, only a subset of the possible uses of the system, they are exemplary in nature and do not reflect any boundaries in the capabilities of the invention.

Figure 4:
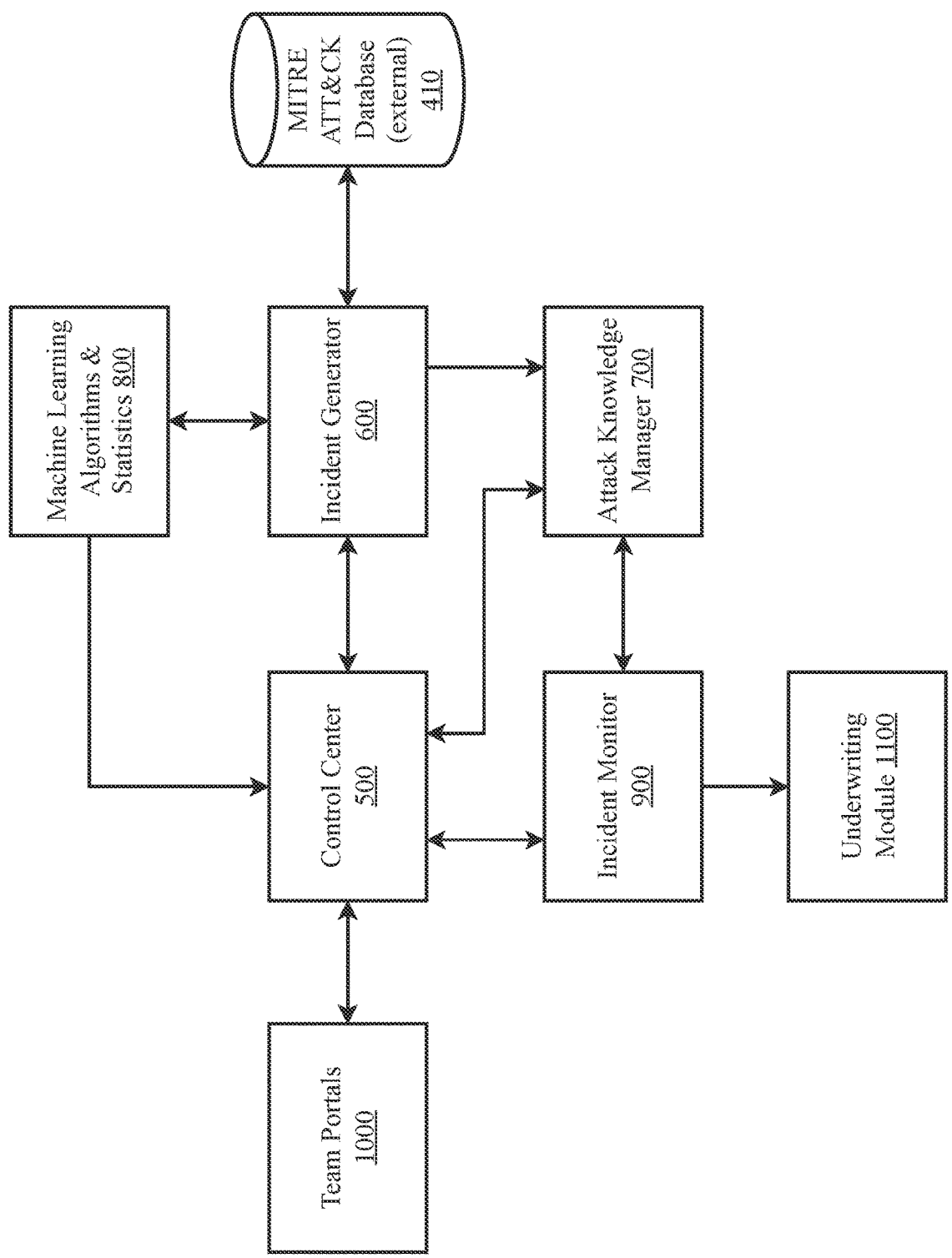
FIG. 4 is a block diagram illustrating an exemplary system architecture for a dynamic cyberattack mission planning and analysis platform.

FIG. 4 is a block diagram illustrating an exemplary system architecture for a dynamic cyberattack mission planning and analysis platform. The platform dynamic cyberattack mission planning and analysis platform provides a comprehensive solution for mission planning for cybersecurity analysis. The disclosed technology provides a system for analyzing and understanding network events, insights, alerts and incidents based on indicators of instability, failure/outages, attacks, or declared incidents to see who, what, when, where and why something might have occurred. The system connects observability, security controls, application performance management, network, stack trace, and behavioral indicators to provide comprehensive insights for SOC analysts and leaders. The system includes a split-screen user interface that can be used with an AI co-pilot to help users understand their "partial observability" and track events in real-time. In one application, the platform enables red and blue team exercises to provide comprehensive network security investigations using AI-assisted attack and defense strategies.

The platform of this exemplary embodiment comprises a control center 500, an incident generator 600, an attack knowledge manager 700, a machine learning algorithms and statistics module 800, an incident monitor 900, team portals 1000, and an underwriting module 1100. Information may further be gathered from external sources such as the MITRE ATT&CK database 410.

Control system 500 manages the overall work of the platform, coordinating the operation of the other major platform components. Control system 500 provides administrative controls such as platform security controls, network visualizations, and incident management controls such as attack mode controls and event filters. Control system 500 assesses application performance and network health during any ongoing red and blue team exercises, as well as evaluating red and blue team performance. Control system 500 provides observability into all of the foregoing via an observability manager, which displays the various aspects of the operation of platform at the request of an administrative user.

Incident generator 600 generates scenarios for red and blue team exercises by applying machine learning algorithms to external and internal information about a network under analysis to generate valid and targeted red and blue team attack/defense scenarios. Incident generator 600 has the ability to select incidents, alerts, events, and insights based on selected tactics, techniques, and procedures (TTPs) or threat actors using a combination of search queries, filtering criteria, and use of machine learning algorithms.

Information processed by machine learning algorithms to generate such scenarios includes, but is not limited to, information about current cybersecurity concerns (e.g., from external cybersecurity tracking websites and databases), knowledge of the network under analysis and the enterprise that owns the network, and statistical information about similar networks and situations. Incident generator 600 generates scenarios by selecting factors including, but not limited to, attack modes (e.g., which types or modes of cybersecurity attack to use), severity of events in the attack, which event types to include, which networks or network subsystems to be affected by the attack, and devices or device types to be included in the attack. The cybersecurity scenarios generated by incident generator 600 do not have to be used for red and blue team exercises. They may be used by the network's information technology (IT) and administrative staff more generally to evaluate network risk management (e.g., by separately investigating possible weaknesses in the network's security or other network security concerns).

Attack knowledge manager 700 gathers and stores information about the network under analysis, the enterprise that owns the network, and other contextual information that may be useful either in risk management of the network or that may be useful in generating scenarios for red and blue team exercises. The information gathered and stored by attack knowledge manager 700 includes, but is not limited to, information about the network under analysis (e.g., the type of network, the location of the network, the type of network security, the structure or architecture of the network, existing security systems or protocols, etc.), information about the enterprise that owns the network (e.g., corporate structure information, corporate financial information, corporate legal information, corporate asset information, employees, management, previous cybersecurity incidents, etc.), information about similar enterprises and networks, and other contextual information that may be useful (e.g., that a particular new cybersecurity attack is targeting companies with characteristics similar to that of the enterprise or networks with characteristics similar to that of the network. Attack knowledge manager 700 stores this disparate information in a knowledge graph organized according to an ontology so that meaningful comparisons can be made and systemic risk can be understood. A shared understanding of the terminology and concepts being used, as well as a common ontology for representing the relevant entities and relationships, can be used for generating scenarios and defining objective functions that take into account information-theoretic statistics and mutual information theory. The knowledge graph may be a locally-stored graph database or a cloud-based graph database, and graph query languages (e.g., Cypher or Gremlin) may be used to analyze the knowledge graph. Graph visualization tools (e.g., Gephi or Cytoscape) may be used to visualize and analyze the network under analysis and attack paths in the network.

Machine learning algorithms and statistics module 800 may be used to assess cybersecurity risk and to generate scenarios for defensive cyber operations (e.g., network security changes, red and blue team exercises, etc.). By using techniques like deep learning, reinforcement learning, Monte Carlo tree searches, hierarchical task networks, and "another modeling language" (ANML) solvers, it is possible to generate scenarios for defensive cyber operations that leverage a large number of metrics and objective functions arising from the information contained in attack knowledge manager 700. Because of their ability to identify non-obvious or hidden connections among large amounts of complex information, properly-trained machine learning algorithms are ideal for identifying previously unknown or unidentified cybersecurity vulnerabilities, attack paths or methods, and other cybersecurity concerns.

Some applications of machine learning algorithms include cyber metric analysis for making meaningful comparisons across networks, enterprises, and scenarios, so as to more accurately and effectively allow for analysis of cybersecurity risk management and systemic risk, entities and relationships analysis for assessing risks associated with complex relationships or network arrangements, statistical analysis for comparing averages and baselines, partial observability analysis for determining which actors can observe what interactions during an attack scenario (which is particularly applicable to AI-assistance provided to red teams and blue teams, each of which will have only partial observability of the scenario), and AI-based mission planning to perform mission selection (e.g., via incident generator 600) provides red and blue teams with exercises based on little-known, previously-unsuspected, or highly critical scenarios.

In the context of red and blue team exercises, use of an artificial-intelligence (AI) mission planner has tremendous benefits over the state of the art. Use of trained machine learning algorithms to perform mission selection (e.g., via incident generator 600) provides red and blue teams with exercises based on little-known, previously-unsuspected, or highly critical scenarios. Use of trained machine learning algorithms to assist attackers enhances the experience and intuitive decisions of a red team by suggesting attack strategies to the red team, the attack strategies comprising possible avenues and methods of attack that may not have been considered by the red team. Use of trained machine learning algorithms to assist defenders enhances the experience and intuitive decisions of a blue team by suggesting defense strategies that may not have been considered by the blue team, especially where the attack strategies being used by the red team are unique, novel, or little-known attack strategies that have been suggested by a machine learning algorithm assisting the attackers. Use of machine learning algorithms at each of these three stages (incident generation, red team assistance, and blue team assistance) results in improvements in security team awareness and consistency of evaluation and performance for Security Operations Centers (SOCs). This AI-driven component can help identify gaps in defenses, suggest improvements, and provide recommendations for network security improvements.

Incident monitor 900 tracks the status of a network under assessment, such as when a red and blue team exercise is occurring. Incident monitor 900 logs any relevant cyber metrics of the network so that meaningful comparisons can be made across networks, enterprises, and scenarios, so as to more accurately and effectively allow for analysis of cybersecurity risk management and systemic risk, entities and relationships analysis for assessing risks associated with complex relationships or network arrangements. Incident monitor 900 further tracks application performance, allows for stack trace access to track method calls and other events occurring when an exception is thrown, and behavioral indicators to provide comprehensive insights for SOC analysts and leaders such as understanding the degree to which network behaviors or activities from good or bad actors were in fact observed and available for analysis, as well as where they were unlikely to have been seen, captured, collected, aggregated, persisted, and made available for analysis. The information tracked by incident monitor 900 is used by control center 500 to provide information about the network under analysis by cybersecurity assessment administrators and to team portals 1000 for evaluation by red and blue teams within their respective partial observability windows.

Team portals 1000 are the primary interface through which red and blue teams access information about an ongoing red and blue team exercise. The entirety of any given exercise is visible to cybersecurity assessment administrators via control center 500, but only relevant portions of the exercise are visible to red team and blue team. Thus, a partial observability manager 1010 is used to filter availability of attack and defense related information to the relevant team or teams. Blue team may also have access through the platform to certain network security controls 1020, which may supplement any network security controls directly available to the blue team as the IT and administrative staff of the network under assessment.

Network visualizations available on team portal 1030 combine observability, security controls, application performance management, network, stack trace, and behavioral indicators to provide comprehensive insights for SOC analysts and leaders. The system may utilize a split-screen user interface that can be used with an AI-based attack and defense assistance to help red teams and blue teams each understand their "partial observability" of an ongoing scenario and track events in real-time. Network visualization tools include displays of network events and behaviors, alerts and incident indicators, displays of event relationships, network instability indicators, network failures and outage displays, and attack/defense progress indicators.

Underwriting module 1100 uses information gathered from incident monitor 900 to provide insurance underwriters with risk analysis information for issuing or adjusting policies and premiums for cybersecurity insurance. Networks that have been assessed as being secure may receive preferred policies or premium discounts over those that have been assessed as being less secure or insecure. Terms and conditions of insurance policies may be compared to assessed network security conditions to better tailor the policies to the conditions of the network (e.g., cybersecurity policies may be adjusted to exclude coverage for certain network aspects which are deemed to be insecure, or to delete such exclusions from policies where re-assessment determines that the risk of those aspects has been mitigated). Further, based on comparisons of policy terms with network assessments, any claims made may be evaluated for coverage under the policy either by an insurance adjuster or by another automated system.

DETAILED DESCRIPTION OF EXEMPLARY ASPECTS

Figure 5:
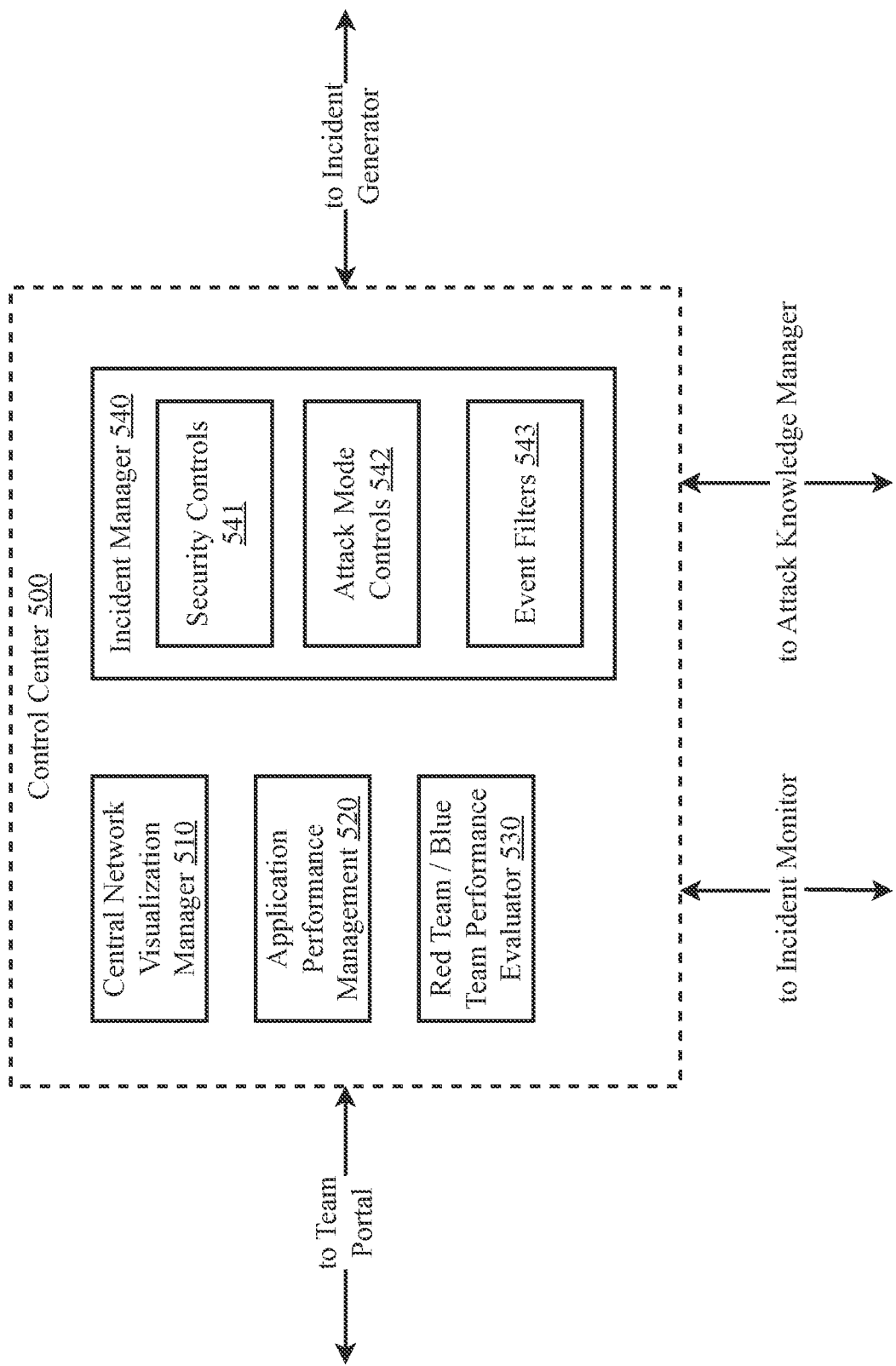
FIG. 5 is a block diagram illustrating an exemplary control center aspect of a dynamic cyberattack mission planning and analysis platform.

FIG. 5 is a block diagram illustrating an exemplary control center aspect of a dynamic cyberattack mission planning and analysis platform. The uses artificial intelligence systems to make red and blue team exercises more comprehensive and effective by supplementing individual expertise, reducing reliance on intuition, and aiding decision-making based on evolving gaps in knowledge. In an embodiment, the platform is coordinated by a control center that supports exercise observation, scoring, after action replay and builds a growing knowledge base for future human or machine based operations planning. An incident generator generates cyberattack scenarios and events using data from external databases and an internal attack knowledge manager having a knowledge graph of data about the network under attack in conjunction with one or more machine learning algorithms configured to identify potential network vulnerabilities. Red collaborates with a set of machine learning algorithms configured to provide suggestions as to potential successful attack paths. Blue teams are guided by a set of machine learning algorithms configured to provide suggestions as to potential impacts of prospective or successful attack paths and potential responses to prevent, interdict, mitigate, respond or recover. Notably, the system is able to track the evolving knowledge of both red and blue teams about the network and systems of interest as they both use their incomplete instrumentation and interactions to aggregate, analyze, interpret and respond in the ongoing adversarial game. Additionally, the system is capable of tracking multiple actors on a single target system of interest as real-world events sometimes have multiple adversaries but such interactions are rarely considered when completing table top exercises or even advanced adversary emulation. Additionally the system is designed to ingest data from offensive tools such as Empire or Cobalt Strike and from blue team tools such as EDRs and SIEMS, to inform the activity log. This enables the composite event to consider "split screen" evaluations and planning and to better estimate human and machine resource consumption from tasks which are as diverse as information gathering to response actions.

Control system 500 manages the overall work of the platform, coordinating the operation of the other major platform components. Control system 500 provides administrative controls such as platform security controls, network visualizations, and incident management controls such as attack mode controls and event filters. Control system 500 assesses application performance and network health during any ongoing red and blue team exercises, as well as evaluating red and blue team performance. Control system 500 provides observability into all of the foregoing via an observability manager, which displays the various aspects of the operation of platform at the request of an administrative user.

Control system of this embodiment comprises a visualization manager 530 which provides complete access to network visualizations as described below in detail for the partial network visualizations of team network visualization manager 1030, an application performance management evaluator 520 for assessing the real-time performance of any applications operating on the network under assessment, a red team/blue team performance evaluator 530 which displays the relative success of attacks by the red team versus defenses to those attacks by the blue team, and an incident manager 540 which allows for management of any red team/blue team exercise. Incident manager 540 further comprises security controls 510 for controlling security of the platform through the exercise is being conducted, attack mode controls 542 to determining and adjusting the tactics, techniques, and procedures (TTPs) or threat actors available to red team, and event filters 543 for controlling and displaying network events during the exercise.

Figure 6:
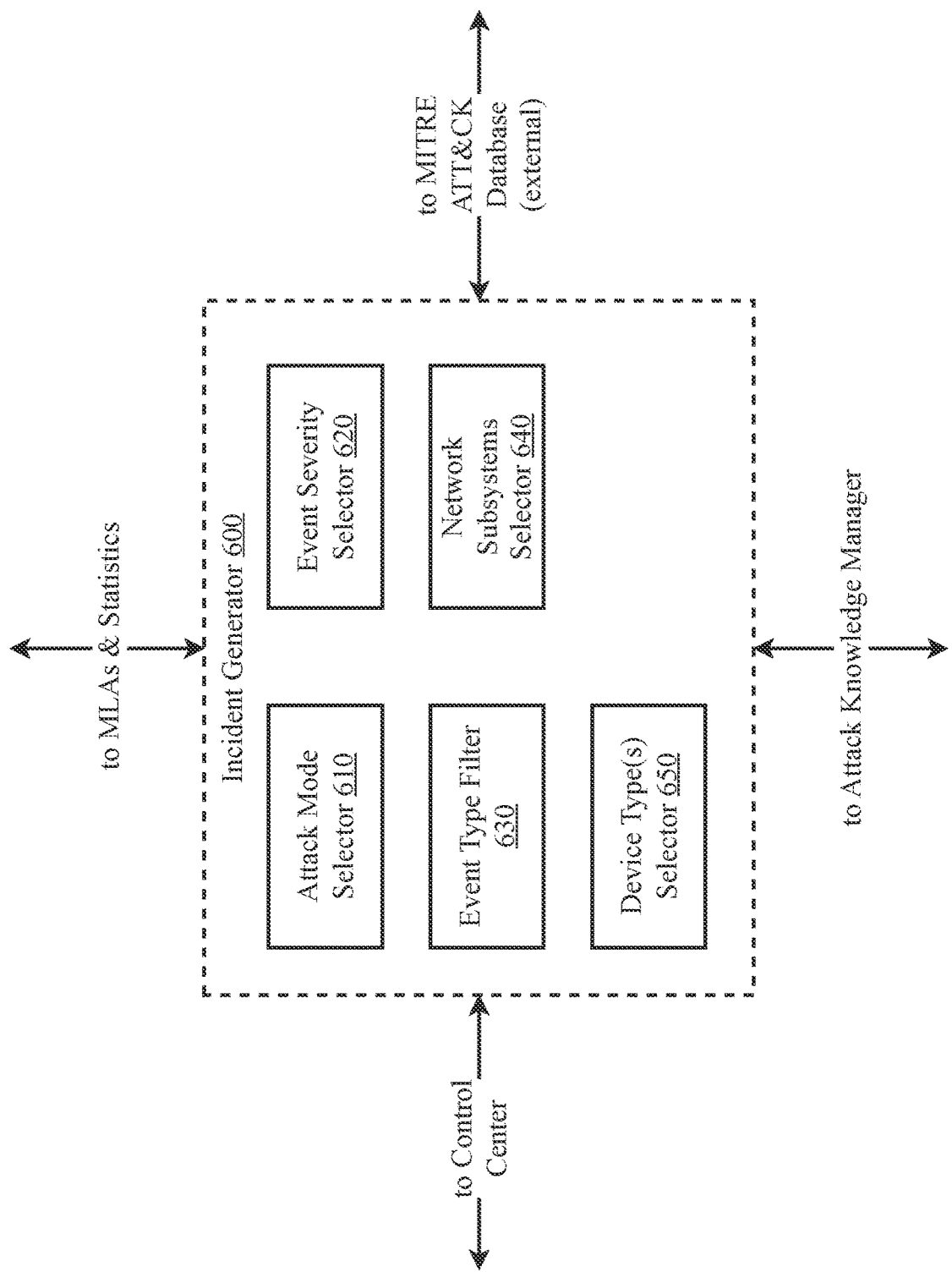
FIG. 6 is a block diagram illustrating an exemplary control incident generator aspect of a dynamic cyberattack mission planning and analysis platform.

FIG. 6 is a block diagram illustrating an exemplary control incident generator aspect of a dynamic cyberattack mission planning and analysis platform. Incident generator 600 generates scenarios for red and blue team exercises by applying machine learning algorithms to external and internal information about a network under analysis to generate valid and targeted red and blue team attack/defense scenarios. Incident generator 600 has the ability to select incidents, alerts, events, and insights based on selected tactics, techniques, and procedures (TTPs) or threat actors using a combination of search queries, filtering criteria, and use of machine learning algorithms. Incident generator 600 of this embodiment comprises an attack mode selector 610, an event severity selector 620, an event type filter 630, a network subsystems selector 640, and a device type selector 650.

Information processed by machine learning algorithms to generate such scenarios includes, but is not limited to, information about current cybersecurity concerns (e.g., from external cybersecurity tracking websites and databases such as the MITRE ATT&CK database 410), knowledge of the network under analysis and the enterprise that owns the network, and statistical information about similar networks and situations. Incident generator 600 generates scenarios by selecting factors including, but not limited to, attack modes (e.g., which types or modes of cybersecurity attack to use)

using attack mode selector 610, severity of events in the attack using event severity selector 620, which event types to include using event type filter 630, which networks or network subsystems to be affected by the attack using network subsystems selector 640, and devices or device types to be included in the attack using device type selector 650. The cybersecurity scenarios generated by incident generator 600 do not have to be used for red and blue team exercises. They may be used by the network's information technology (IT) and administrative staff more generally to evaluate network risk management (e.g., by separately investigating possible weaknesses in the network's security or other network security concerns).

Figure 7:
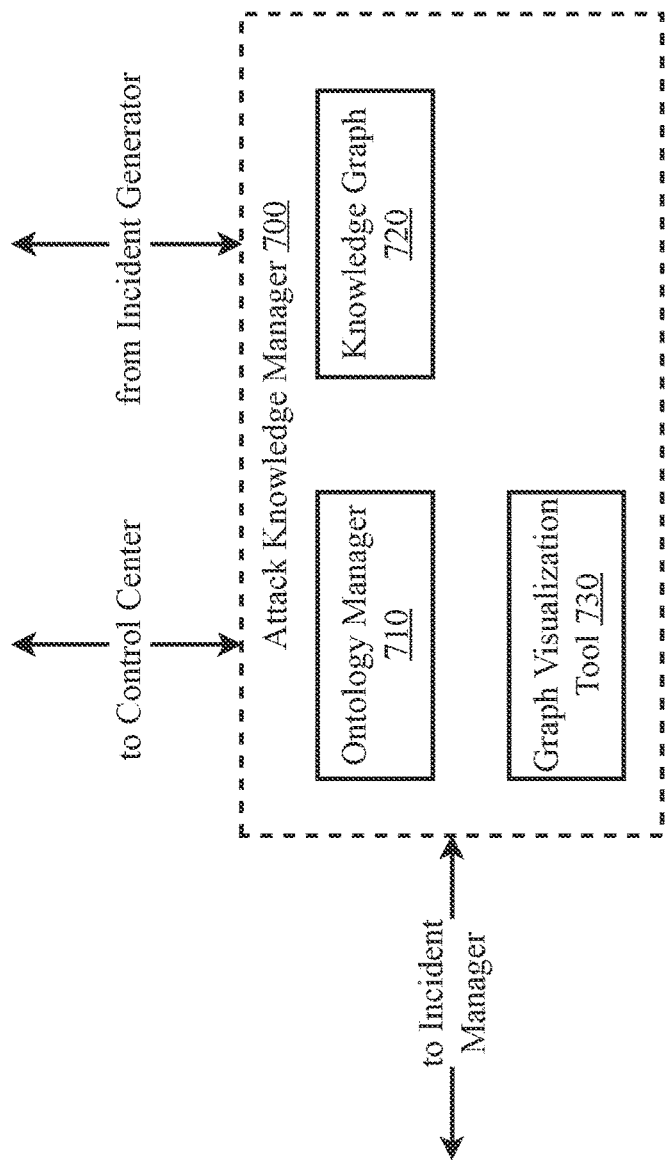
FIG. 7 is a block diagram illustrating an exemplary control attack knowledge manager aspect of a dynamic cyberattack mission planning and analysis platform.

FIG. 7 is a block diagram illustrating an exemplary control attack knowledge manager aspect of a dynamic cyberattack mission planning and analysis platform. Attack knowledge manager 700 gathers and stores information about the network under analysis, the enterprise that owns the network, and other contextual information that may be useful either in risk management of the network or that may be useful in generating scenarios for red and blue team exercises. The information gathered and stored by attack knowledge manager 700 includes, but is not limited to, information about the network under analysis (e.g., the type of network, the location of the network, the type of network security, the structure or architecture of the network, existing security systems or protocols, etc.), information about the enterprise that owns the network (e.g., corporate structure information, corporate financial information, corporate legal information, corporate asset information, employees, management, previous cybersecurity incidents, etc.), information about similar enterprises and networks, and other contextual information that may be useful (e.g., that a particular new cybersecurity attack is targeting companies with characteristics similar to that of the enterprise or networks with characteristics similar to that of the network.

Attack knowledge manager 700 stores this disparate information in a knowledge graph 720 organized according to an ontology so that meaningful comparisons can be made and systemic risk can be understood. A knowledge graph is a data structure that represents knowledge in a structured and interconnected way using nodes representing entities, events, and concepts, and edges representing relationships between the nodes. It is designed to capture information about entities (such as people, places, events, and concepts) and their relationships. Knowledge graphs are typically built using semantic technologies and ontologies. They aim to capture the semantics of the data by assigning meaning to the entities and relationships. This enables more advanced and intelligent processing of the data, as the relationships between different entities can be analyzed and inferred. Knowledge graphs can be used to organize and integrate diverse sources of information, such as databases, documents, and web pages. They provide a unified view of the data, allowing users to explore and query the knowledge in a more meaningful and efficient way. Using a knowledge graph to store the information about the network, its enterprise owner, and any contextual knowledge about attacks and defenses is useful because complex relationships that can be represented and analyzed by machine learning algorithms to identify little-known, hidden, or unknown relationships that may affect cybersecurity.

An ontology manager 710 helps define the relationships by creating a shared understanding of the terminology and concepts being used, as well as a common ontology for representing the relevant entities and relationships. An ontology is a formal and explicit specification of the concepts, relationships, and properties that exist within a particular domain of knowledge. It provides a shared understanding of the structure and meaning of the information within that domain, and define the vocabulary and semantics that can be used to describe entities and their relationships within a specific domain, in this case cybersecurity. Ontologies typically consist of classes (or concepts), properties, and relationships. Classes represent categories or types of entities, properties define the attributes or characteristics of entities, and relationships specify how entities are related to each other. These components are often organized in a hierarchical or taxonomic structure, where more specific concepts are subclasses of more general concepts. Ontologies are usually represented using formal languages such as the Web Ontology Language (OWL) or the Resource Description Framework (RDF). These languages provide a standardized syntax and semantics for representing ontologies and enable interoperability between different systems and applications. Ontologies have various applications, including knowledge representation, data integration, semantic search, reasoning, and machine learning. They enable machines to understand and reason about the meaning of information, facilitating more intelligent and automated processing of data.

The resulting ontology, as reflected in the knowledge graph, can be used for generating scenarios and defining objective functions that take into account information-theoretic statistics and mutual information theory. The knowledge graph may be a locally-stored graph database or a cloud-based graph database, and graph query languages (e.g., Cypher or Gremlin) may be used to analyze the knowledge graph. Graph visualization tools 730 (e.g., Gephi or Cytoscape) may be used to visualize and analyze the network under analysis and attack paths in the network.

Figure 8:
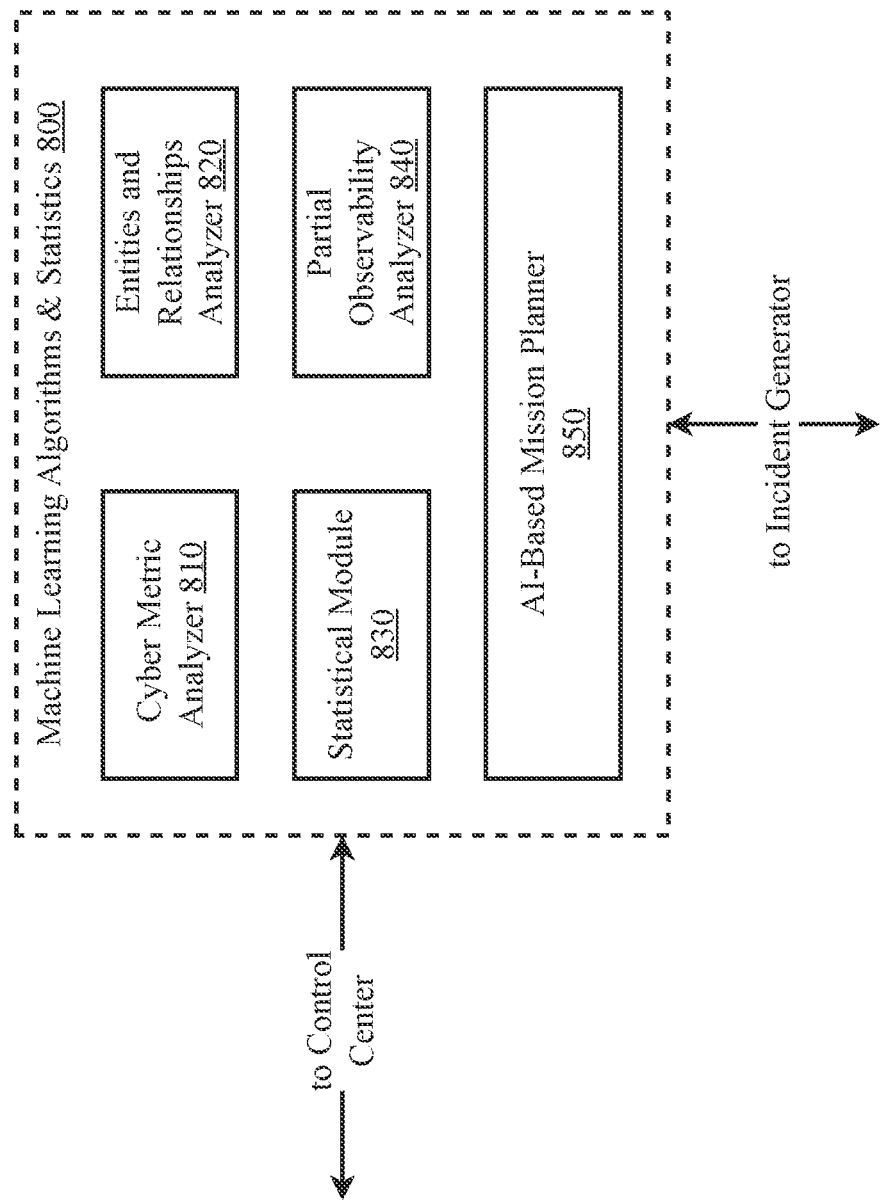
FIG. 8 is a block diagram illustrating an exemplary control machine learning algorithm and statistics aspect of a dynamic cyberattack mission planning and analysis platform.

FIG. 8 is a block diagram illustrating an exemplary control machine learning algorithm and statistics aspect of a dynamic cyberattack mission planning and analysis platform. Machine learning algorithms and statistics module 800 may be used to assess cybersecurity risk and to generate scenarios for defensive cyber operations (e.g., network security changes, red and blue team exercises, etc.). By using techniques like deep learning, reinforcement learning, Monte Carlo tree searches, hierarchical task networks, and "another modeling language" (ANML) solvers, it is possible to generate scenarios for defensive cyber operations that leverage a large number of metrics and objective functions arising from the information contained in attack knowledge manager 700. Because of their ability to identify non-obvious or hidden connections among large amounts of complex information, properly-trained machine learning algorithms are ideal for identifying previously unknown or unidentified cybersecurity vulnerabilities, attack paths or methods, and other cybersecurity concerns.

Machine learning algorithms 800 of this embodiment comprise a cyber metric analyzer 810 for making meaningful comparisons across networks, enterprises, and scenarios, so as to more accurately and effectively allow for analysis of cybersecurity risk management and systemic risk, a entities and relationships analyzer 820 for assessing risks associated with complex relationships or network arrangements, a statistical module 830 for comparing averages and baselines, a partial observability analyzer 840 for determining which actors can observe what interactions during an attack scenario (which is particularly applicable to AI-assistance provided to red teams and blue teams, each of which will have only partial observability of the scenario), and an AI-based mission planner 850 to perform mission selection (e.g., via incident generator 600) provides red and blue teams with exercises based on little-known, previously-unsuspected, or highly critical scenarios. AI-based mission planner 850 in combination with partial observability analyzer 840 can be used to provide specific attack assistance to red team and specific defense assistance to blue team.

Entities and relationships analyzer 820, statistical module 830, and partial observability analyzer 840 are capable of tracking multiple actors on a single target system of interest as real-world events sometimes have multiple adversaries but such interactions are rarely considered when completing table top exercises or even advanced adversary emulation.

In the context of red and blue team exercises, use of an artificial-intelligence (AI)-based mission planner 850 has tremendous benefits over the state of the art. Use of AI-based mission planner 850 to perform mission selection (e.g., via incident generator 600) provides red and blue teams with exercises based on little-known, previously-unsuspected, or highly critical scenarios. Use of AI-based mission planner 850 in conjunction with partial observability analyzer 840 to assist attackers enhances the experience and intuitive decisions of a red team by providing the red team with possible avenues and methods of attack that may not have been considered by the red team. Use of AI-based mission planner 850 in conjunction with partial observability analyzer 840 to assist defenders enhances the experience and intuitive decisions of a blue team by suggesting defense strategies that may not have been considered by the blue team, especially where the attack strategies being used by the red team are unique, novel, or little-known attack strategies that have been suggested by a machine learning algorithm assisting the attackers. Use of machine learning algorithms at each of these three stages (incident generation, red team assistance, and blue team assistance) results in improvements in security team awareness and consistency of evaluation and performance for Security Operations Centers (SOCs). The system may operate iteratively, first generating a cybersecurity incident that threatens the network under assessment, then suggesting defense strategies to a blue team to mitigate the cybersecurity incident, and then suggesting attack strategies designed to overcome the defense strategies. The process of alternately suggesting attack and defense strategies can be repeated until a comprehensive set of attacks and defenses to the cybersecurity incident has been assessed for the network under assessment. This AI-driven scenario selection and attack/defense assistance can help identify gaps in defenses, suggest improvements, and provide recommendations for network security improvements.

Utilizing a split screen red team/blue team cyber knowledge system combining AI-based mission planner 850 with partial observability analyzer 840 can significantly enhance decision-making and tactical planning for both red and blue teams. Further, by leveraging techniques like Monte Carlo Tree Search (MCTS) with Reinforcement Learning (RL), Hierarchical Task Network (HTN) planners for ANML, or Partially Observable Markov Decision Processes (POMDP), this AI-based network assessment methodology can provide suggestions for potential future actions for both teams based on an ever-growing database of real and practice events. As the AI-based network assessment methodology continuously analyzes the gameplay data from red and blue team events, it can identify patterns, trends, and tactics used by both sides. By combining this knowledge with other artificial intelligence (AI) techniques, the system can make informed suggestions for future actions, such as: identifying weaknesses in the blue team's defenses and suggesting improvements or additional security measures, anticipating the red team's tactics and providing the blue team with countermeasures or strategies to detect and mitigate potential threats, and recommending novel attack strategies or techniques for the red team to test the blue team's defenses further. This methodology also provides a continuous feedback loop for network owners to improve their security postures. By iteratively learning from real and practice events, the AI-driven system can adapt to new threats and tactics, ensuring that both red and blue teams stay up-to-date on the latest cybersecurity trends and best practices.

The AI-driven network evaluation methodology described herein can be extended to suggest new configurations, architectures, or observability tools for improved security and efficiency within an organization. By continuously analyzing data from both red and blue teams, the system can identify areas for improvement and recommend specific changes or additions to the existing security infrastructure. Some examples of such improvements follow.

The AI-driven network evaluation methodology described herein can be used to suggest new configurations or architectures. As weak points are identified in an organization's network, architectural changes or configurations that enhance security may be suggested. For example, VLAN segmentation may be suggested for services using NTLM and RC4, which cannot be easily upgraded to more secure authentication methods like Kerberos or SAML. This segmentation can help isolate potentially vulnerable services and reduce the attack surface.

The AI-driven network evaluation methodology described herein can be used to recommend compensating controls. For example, the system can identify areas where compensating controls, such as Network Detection and Response (NDR) solutions, would provide significant value. By placing these controls at likely chokepoints, organizations can improve their ability to detect and respond to threats, especially if their existing authentication mechanisms are weak or outdated.

The AI-driven network evaluation methodology described herein can be used to adapt to personnel changes. For example, the system can detect when an individual undergoes a role change within the organization and recommend additional analytic routines or monitoring for that person. This ensures that individuals with access to sensitive information are appropriately monitored, reducing the risk of insider threats.

The AI-driven network evaluation methodology described herein can be used to optimize resource utilization. For example, the system can also identify areas where existing security tools and controls are not effectively contributing to detection and observability goals. By analyzing the specific threat actors and their associated TTPs, the AI-driven system can recommend reallocating resources or eliminating redundant or underperforming tools. This optimization helps organizations save money and focus on deploying the most effective security measures in the areas where they are most needed.

Figure 9:
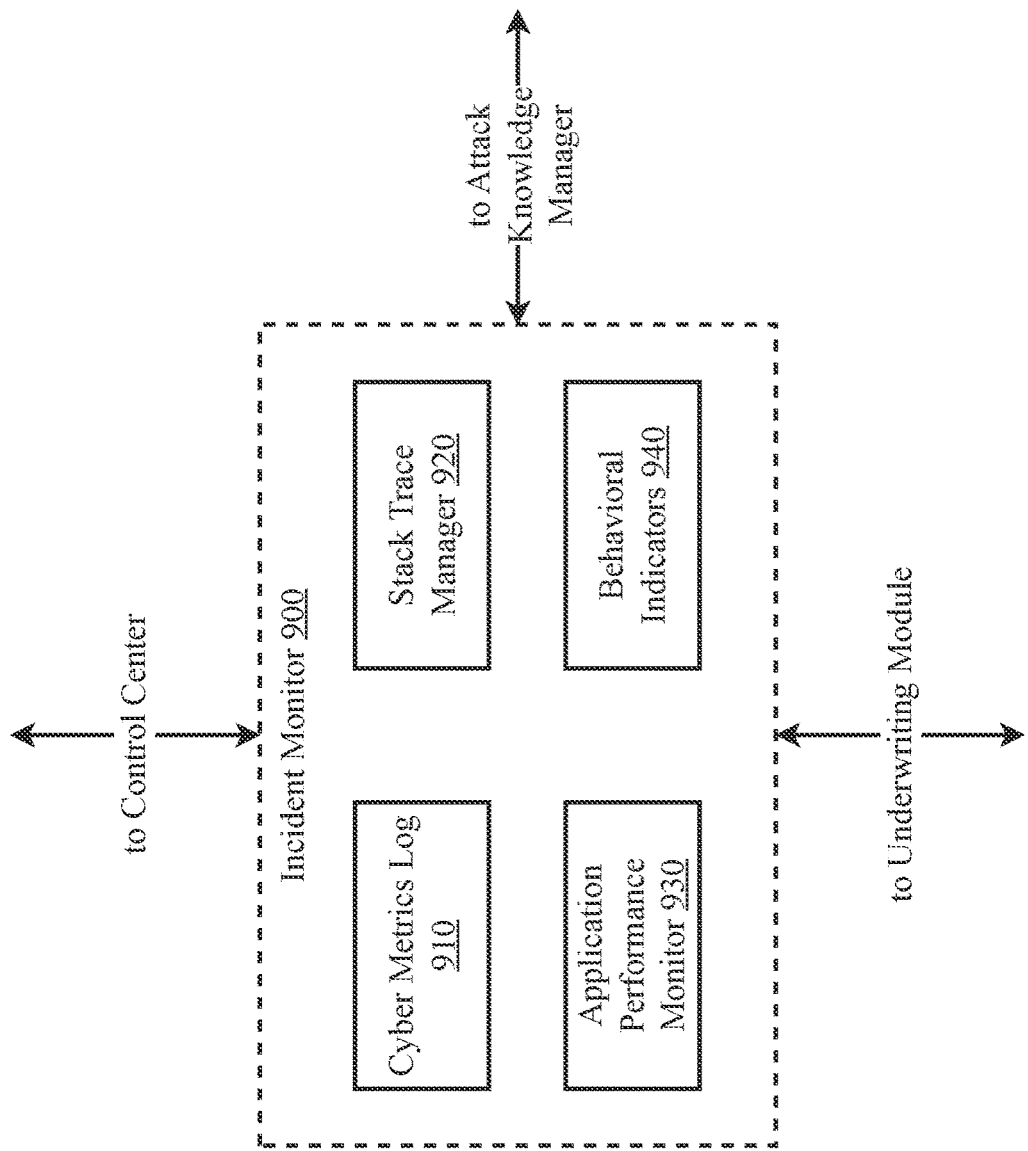
FIG. 9 is a block diagram illustrating an exemplary control incident monitor aspect of a dynamic cyberattack mission planning and analysis platform.

FIG. 9 is a block diagram illustrating an exemplary control incident monitor aspect of a dynamic cyberattack mission planning and analysis platform. Incident monitor 900 tracks the status of a network under assessment, such as when a red and blue team exercise is occurring. Incident monitor 900 logs any relevant cyber metrics of the network using a cyber metrics log 910 so that meaningful comparisons can be made across networks, enterprises, and scenarios, so as to more accurately and effectively allow for analysis of cybersecurity risk management and systemic risk, entities and relationships analysis for assessing risks associated with complex relationships or network arrangements. Incident monitor 900 further tracks application performance using an application performance monitor 930, and allows for stack trace access to track method calls and other events occurring when an exception is thrown using a stack trace manager 920, and tracks behavioral indicators 940 to provide comprehensive insights for SOC analysts and leaders such as understanding the degree to which network behaviors or activities from good or bad actors were in fact observed and available for analysis, as well as where they were unlikely to have been seen, captured, collected, aggregated, persisted, and made available for analysis. The information tracked by incident monitor 900 is used by control center 500 to provide information about the network under analysis by cybersecurity assessment administrators and to team portals 1000 for evaluation by red and blue teams within their respective partial observability windows.

Figure 10:
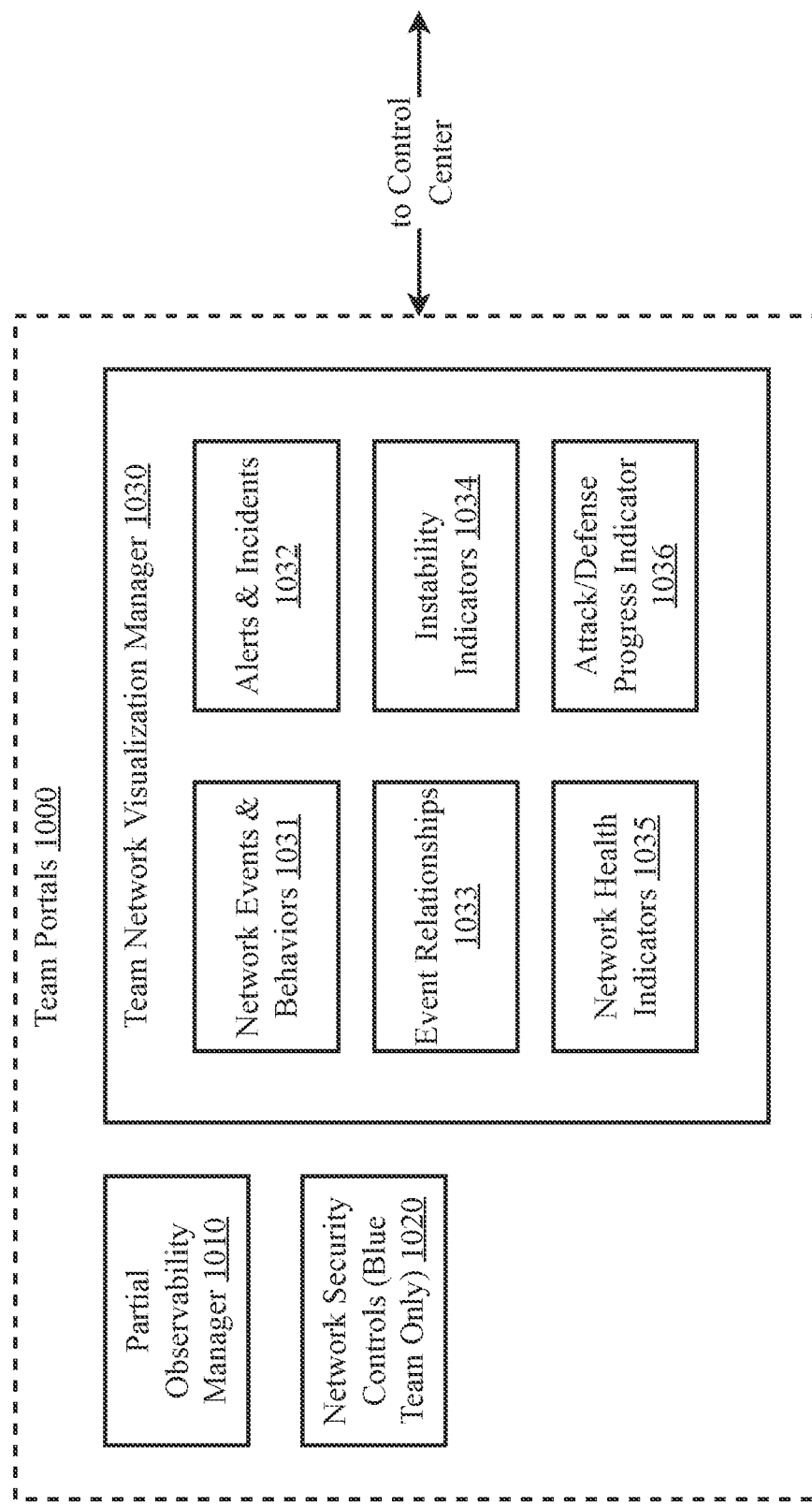
FIG. 10 is a block diagram illustrating an exemplary control team portals aspect of a dynamic cyberattack mission planning and analysis platform.

FIG. 10 is a block diagram illustrating an exemplary control team portals aspect of a dynamic cyberattack mission planning and analysis platform. Team portals 1000 are the primary interface through which red and blue teams access information about an ongoing red and blue team exercise. The entirety of any given exercise is visible to cybersecurity assessment administrators via control center 500, but only relevant portions of the exercise are visible to red team and blue team. Thus, a partial observability manager 1010 is used to filter availability of attack and defense related information to the relevant team or teams. Blue team may also have access through the platform to certain network security controls 1020, which may supplement any network security controls directly available to the blue team as the IT and administrative staff of the network under assessment.

A team network visualization manager 1030 provides observability (as determined by partial observability manager 1010) into relevant aspects of the network's operations during a red team/blue team exercise. The system may utilize a split-screen user interface that can be used with an AI-based attack and defense assistance to help red teams and blue teams each understand their "partial observability" of an ongoing scenario and track events in real-time. Network visualization tools include displays of network events and behaviors 1031, alerts and incident indicators 1032, displays of event relationships 1033, network instability indicators 1034, network health indicators 1035, and attack/defense progress indicators 1036.

Team network visualization manager 1030 provides planning and filters on comprehensive controls and events that are viewable for red team and blue team members. Red team tools (e.g. Cobalt Strike or Empire) can be processed similar to log sources and other blue team telemetry, allowing leaders to observe the efficacy of the red team versus the blue team.

Team portals 1000 may receive and utilize AI-based assistance as described above for AI-based mission planner 850 in conjunction with partial observability analyzer 840, providing assistance to SOC analysts and leaders to quickly and efficiently analyze network events, identify potential threats, and take proactive measures to mitigate risks. The technology provides a powerful tool for incident response, red teaming, and risk management, providing a comprehensive view of network activity and ensuring organizations can respond to potential threats in real-time.

Teams can receive information about incidents, alerts, events, and insights based on selected TTPs using combination of search queries and filtering criteria. For example, a set of search queries may be defined that target specific TTPs or threat actors (e.g., using use regular expressions to search for specific keywords or patterns that are associated with known TTPs or threat actors). Alternatively, a team may use pre-built queries or rules that are designed to detect specific TTPs or threat actors based on their known behaviors or indicators. Teams may apply filtering criteria to the results of their search queries to further refine their selection of incidents, alerts, events, and insights. For example, teams can filter based on the time frame of the activity, the severity of the alert or event, the affected assets or systems, or other relevant attributes. Additionally, through team portal 1000, teams can use the MITRE ATT&CK framework as a guide to identify potential gaps in their coverage or visibility. By mapping your existing controls and events to the relevant TTPs or threat actors, teams can identify areas where they may need to improve their detection or response capabilities.

Based on the selection of incidents, alerts, events, and insights as described above, team network visualization manager 1030 may display a subset of knowledge graph 720 the different entities, events, and concepts related to an assessment of a network and the relationships between them. The resulting subset of knowledge graph 720 can be visualized using a graph visualization tool like Gephi or Cytoscape, which allows for the creation of interactive visualizations of the graph. This allows for a visual representation of the asset and attack paths in the network, which can be useful for understanding the scope of an attack and identifying potential areas for mitigation.

Figure 11:
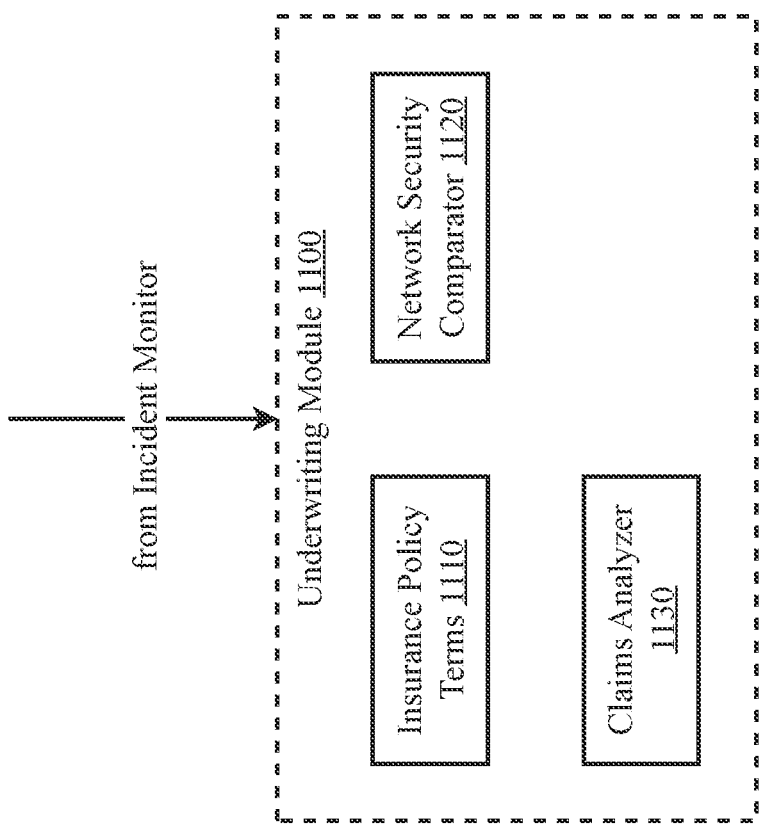
FIG. 11 is a block diagram illustrating an exemplary control underwriting module aspect of a dynamic cyberattack mission planning and analysis platform.

FIG. 11 is a block diagram illustrating an exemplary control underwriting module aspect of a dynamic cyberattack mission planning and analysis platform. Underwriting module 1100 uses information gathered from incident monitor 900 to provide insurance underwriters with risk analysis information for issuing or adjusting policies and premiums for cybersecurity insurance. Networks that have been assessed as being secure may receive preferred policies or premium discounts over those that have been assessed as being less secure or insecure. Terms and conditions of insurance policies 1110 may be compared to assessed network security conditions using a network security comparator 1120 to better tailor the policies to the conditions of the network (e.g., cybersecurity policies may be adjusted to exclude coverage for certain network aspects which are deemed to be insecure, or to delete such exclusions from policies where re-assessment determines that the risk of those aspects has been mitigated). To perform this comparison, network security comparator 1120 may configured to select each term of a policy and compare it to an aspect of a network security assessment using a set of rules for that policy term (as a simple example, a policy term may exclude coverage for insecure networks wherein an insecure network is defined in a rule has having more than 10 publicly-accessible open network ports). Further, based on comparisons of policy terms with network assessments, any claims made may be evaluated for coverage under the policy. Thus, underwriting module 1100 allows for active controls present during an event to be compared against network topology and threat actor tactics, techniques, and procedures (TTPs) and profiles of interest to include comparisons against the scenarios considered in underwriting and loss control/mitigation stages.

Exemplary Computing Environment

Figure 12:
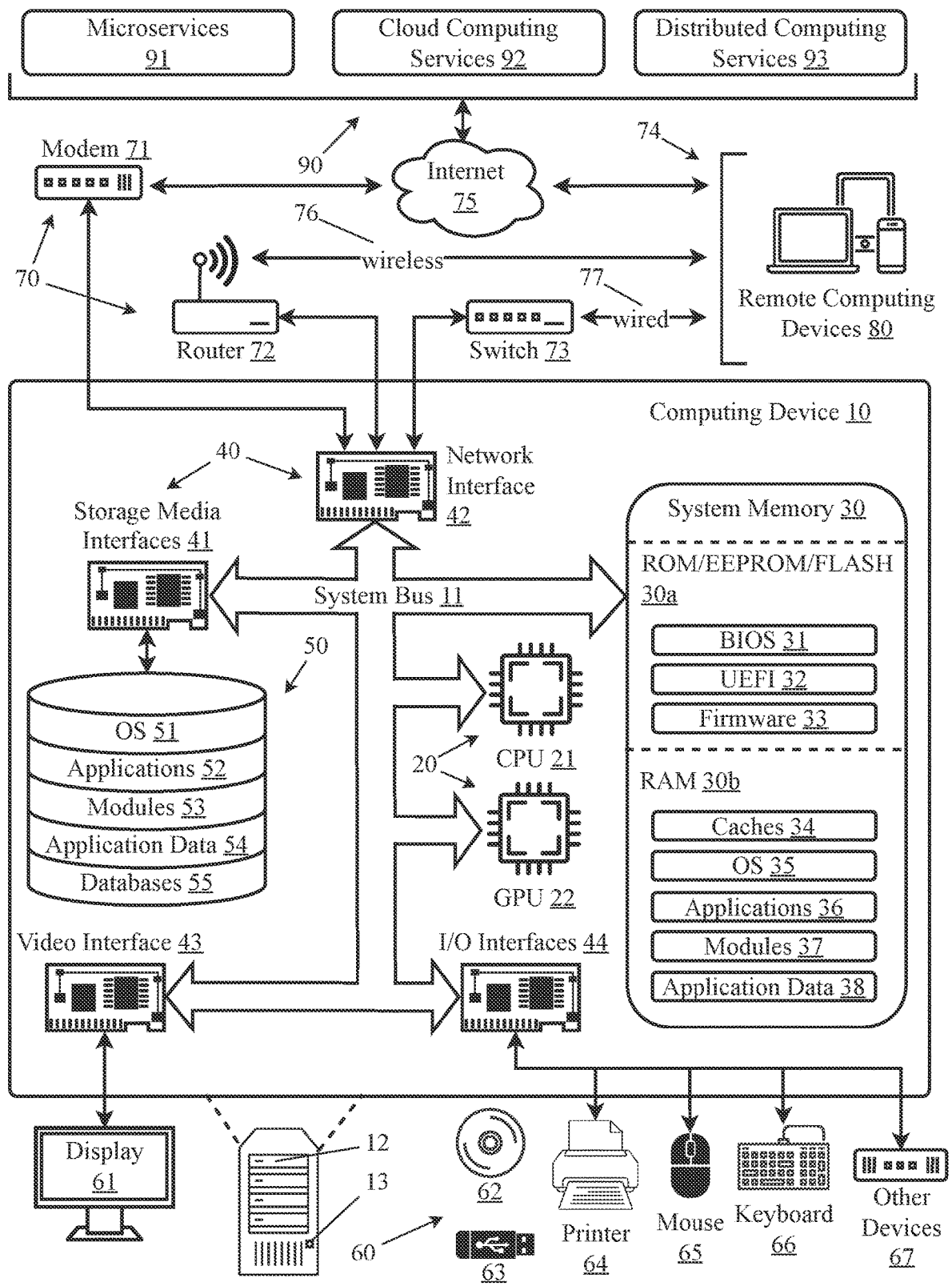
FIG. 12 illustrates an exemplary computing environment on which an embodiment described herein may be implemented.

FIG. 12 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92.

Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. An artificial-intelligence-assisted (AI-assisted) cyberattack mission planning system, comprising:
   a computing device comprising a memory, a processor, and a non-volatile data storage device;
   a first machine learning algorithm operating on the computing device and trained to generate a cyberattack scenario based on information from a knowledge graph;
   a knowledge graph stored on the non-volatile data storage device, the knowledge graph comprising nodes representing entities, concepts, or events, and edges representing relationships between the nodes, wherein the knowledge graph represents knowledge about a computer network;
   an ontology manager comprising a first plurality of programming instructions stored in the memory which, when operating on the processor, causes the computing device to:

retrieve cybersecurity context information from a cybersecurity database;
organize the cybersecurity context information into an ontology;
receive information about the computer network, the information comprising a network configuration; and
create nodes and edges in the knowledge graph to store the information about the computer network according to the ontology
an incident generator comprising a second plurality of programming instructions stored in the memory which, when operating on the processor, causes the computing device to:
retrieve a cybersecurity threat in the form of a tactic, techniques, or procedure from the cybersecurity database;
process the cybersecurity threat through the first machine learning algorithm to generate a cyberattack scenario for the computer network based on the information about the computer network contained in the knowledge graph; and
generate a cybersecurity incident for the computer network from the cyberattack scenario, the cybersecurity incident comprising an attack mode and event severity.

2. The system of claim 1, further comprising a control center comprising a third plurality of programming instructions stored in the memory which, when operating on the processor, causes the computing device to:
carry out the cybersecurity incident on the computer network; and
display a visualization of the progress of the cybersecurity incident.

3. The system of claim 2, further comprising a second machine learning algorithm trained to suggest defense strategies for mitigating the cybersecurity incident.

4. The system of claim 3, further comprising a blue team portal which provides the defense strategies to a blue team comprising information technology (IT) personnel or cybersecurity analysts assigned to mitigate the cybersecurity incident.

5. The system of claim 4, further comprising a third machine learning algorithm trained to suggest attack strategies to overcome the defense strategies.

6. The system of claim 5, further comprising a red team portal which provides the attack strategies to a red team comprising IT personnel or cybersecurity analysts assigned to expose weaknesses in the security of the computer network based on the cybersecurity incident.

7. The system of claim 2, further comprising an incident monitor comprising a fourth plurality of programming instructions stored in the memory which, when operating on the processor, causes the computing device to log cyber metrics for the computer network during the course of the carrying out of the cybersecurity incident.

8. The system of claim 7, further comprising an underwriting module comprising a fifth plurality of programming instructions stored in the memory which, when operating on the processor, causes the computing device to:
retrieve a cybersecurity insurance policy, the cybersecurity insurance policy comprising a policy term;
retrieve a cyber metric relevant to the policy term from the log of cyber metrics;
compare the cyber metric to the policy terms to determine a compliance of the cyber metric to the policy term; and
output the determination of compliance.

9. An artificial-intelligence-assisted (AI-assisted) cyberattack mission planning method, comprising the steps of:
a computing device comprising a memory, a processor, and a non-volatile data storage device;
training a first machine learning algorithm operating on a computing device comprising a memory, a processor, and a non-volatile data storage device to generate a cyberattack scenario based on information from a knowledge graph;
storing a knowledge graph stored on the non-volatile data storage device, the knowledge graph comprising nodes representing entities, concepts, or events, and edges representing relationships between the nodes, wherein the knowledge graph represents knowledge about a computer network;
using an ontology manager operating on the computing device to:
retrieve cybersecurity context information from a cybersecurity database;
organize the cybersecurity context information into an ontology;
receive information about the computer network, the information comprising a network configuration; and
create nodes and edges in the knowledge graph to store the information about the computer network according to the ontology
using an incident generator operating on the computing device to:
retrieve a cybersecurity threat in the form of a tactic, techniques, or procedure from the cybersecurity database;
process the cybersecurity threat through the first machine learning algorithm to generate a cyberattack scenario for the computer network based on the information about the computer network contained in the knowledge graph; and
generate a cybersecurity incident for the computer network from the cyberattack scenario, the cybersecurity incident comprising an attack mode and event severity.

10. The method of claim 9, further comprising the step of using a control center operating on the computing device to:
carry out the cybersecurity incident on the computer network; and
display a visualization of the progress of the cybersecurity incident.

11. The method of claim 10, further comprising the step of training a second machine learning algorithm to suggest defense strategies for mitigating the cybersecurity incident.

12. The method of claim 11, further comprising the step of providing the defense strategies to a blue team comprising information technology (IT) personnel or cybersecurity analysts assigned to mitigate the cybersecurity incident via a blue team portal.

13. The method of claim 12, further comprising the step of training a third machine learning algorithm to suggest attack strategies to overcome the defense strategies.

14. The method of claim 13, further comprising the step of providing the attack strategies to a red team comprising IT personnel or cybersecurity analysts assigned to expose weaknesses in the security of the computer network based on the cybersecurity incident via a red team portal.

15. The method of claim 14, further comprising the step of using an underwriting module operating on the computing device to:
retrieve a cybersecurity insurance policy, the cybersecurity insurance policy comprising a policy term;

retrieve a cyber metric relevant to the policy term from the log of cyber metrics;

compare the cyber metric to the policy terms to determine a compliance of the cyber metric to the policy term; and output the determination of compliance.

16. The method of claim 9, further comprising the step of using an incident monitor operating on the computing device to log cyber metrics for the computer network during the course of the carrying out of the cybersecurity incident.

* * * * *